US010176728B2

(12) United States Patent
Carvajal et al.

(10) Patent No.: US 10,176,728 B2
(45) Date of Patent: *Jan. 8, 2019

(54) BIRTHING SIMULATION DEVICES, SYSTEMS, AND METHODS

(71) Applicant: Gaumard Scientific Company, Inc., Miami, FL (US)

(72) Inventors: Miguel Carvajal, Miami Springs, FL (US); Victor Fernandez, Miami, FL (US); Jeffrey Karpf, Miami, FL (US); Yojans Lurbe, Miami, FL (US); Lazaro Morales, Miami, FL (US); Alberto Rodriguez, Miami, FL (US)

(73) Assignee: GAUMARD SCIENTIFIC COMPANY, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,982

(22) Filed: Nov. 18, 2016

(65) Prior Publication Data

US 2017/0069233 A1 Mar. 9, 2017

Related U.S. Application Data

(63) Continuation of application No. 14/213,962, filed on Mar. 14, 2014, now Pat. No. 9,501,953.

(60) Provisional application No. 61/801,714, filed on Mar. 15, 2013.

(51) Int. Cl.
*G09B 23/28* (2006.01)
*G09B 23/32* (2006.01)

(52) U.S. Cl.
CPC ........... *G09B 23/32* (2013.01); *G09B 23/281* (2013.01)

(58) Field of Classification Search
USPC .............. 434/262, 267, 272, 273, 274, 275; 446/295, 296, 390, 391
See application file for complete search history.

(56) References Cited

U.S. PATENT DOCUMENTS

| 3,822,486 A | 7/1974 | Knapp |
| 3,824,709 A | 7/1974 | Knapp |
| 3,826,019 A | 7/1974 | Knapp et al. |
| 6,071,169 A | 6/2000 | Cook |

(Continued)

FOREIGN PATENT DOCUMENTS

KR 10-2004-0023627 3/2004

OTHER PUBLICATIONS

International Search Report and Written Opinion received in Patent Cooperation Treaty Application No. PCT/US2014/029147, dated Jul. 15, 2014, 13 pages.

*Primary Examiner* — Kurt Fernstrom
(74) *Attorney, Agent, or Firm* — Haynes and Boone LLP

(57) ABSTRACT

Devices, systems, and methods appropriate for use in medical training are disclosed. In some instances, a patient simulator system is provided that includes a maternal patient simulator and a fetal patient simulator. The maternal patient simulator includes an internal chamber sized to receive the fetal patient simulator and a birthing mechanism disposed within the internal chamber configured to translate and rotate the fetal patient simulator with respect to the maternal patient simulator to simulate a birth. In some instances, the fetal patient simulator an internal support structure that includes spinal components, left arm components, right arm components, left leg components, and right leg components with a skin layer covering the internal support structure.

12 Claims, 53 Drawing Sheets

(56) References Cited

U.S. PATENT DOCUMENTS

| | | |
|---|---|---|
| 6,503,087 B1 | 1/2003 | Eggert |
| 6,604,980 B1 | 8/2003 | Jurmain |
| 6,749,433 B2 | 6/2004 | Kassai |
| 6,957,961 B1 | 10/2005 | Owens |
| 7,241,145 B2 | 7/2007 | Riener |
| 8,152,532 B2 | 4/2012 | Eggert et al. |
| 8,197,259 B2 | 6/2012 | Allen et al. |
| 8,517,740 B2 | 8/2013 | Trotta |
| 8,678,831 B2 | 3/2014 | Trotta |
| 9,123,261 B2 | 9/2015 | Lowe |
| 2007/0117077 A1 | 5/2007 | Gordon |
| 2012/0214144 A1 | 8/2012 | Trotta et al. |

BIRTHING SIMULATION DEVICES, SYSTEMS, AND METHODS

CROSS-REFERENCE TO RELATED APPLICATIONS

The present application is a continuation of U.S. patent application Ser. No. 14/213,962 filed Mar. 14, 2014, now U.S. Pat. No. 9,501,953, which claims priority to and the benefit of U.S. Provisional Patent Application No. 61/801,714 filed Mar. 15, 2013, each of which is hereby incorporated by reference in its entirety.

BACKGROUND

As medical science has progressed, it has become increasingly important to provide non-human interactive formats for teaching patient care. While it is desirable to train medical personnel in patient care protocols before allowing contact with real patients, textbooks and flash cards lack the important benefits to students that can be attained from hands-on practice. On the other hand, allowing inexperienced students to perform medical procedures on actual patients that would allow for the hands-on practice cannot be considered a viable alternative because of the inherent risk to the patient. Non-human interactive devices and systems can be used to teach the skills needed to successfully identify and treat various patient conditions without putting actual patients at risk.

For example, patient care education has often been taught using medical instruments to perform patient care activity on a simulator, such as a manikin. Such training devices and systems can be used by medical personnel and medical students to teach and assess competencies such as patient care, medical knowledge, practice based learning and improvement, systems based practice, professionalism, and communication. The training devices and systems can also be used by patients to learn the proper way to perform self-examinations.

While existing simulators have been adequate in many respects, they have not been adequate in all respects. Therefore, what is needed is an interactive education system for use in conducting patient care training sessions that is even more realistic and/or includes additional simulated features.

SUMMARY

Devices, systems, and methods appropriate for use in medical training using a patient simulator are disclosed. In some instances, a patient simulator system is provided that includes a maternal patient simulator and a fetal patient simulator. The maternal patient simulator includes an internal chamber sized to receive the fetal patient simulator and a birthing mechanism disposed within the internal chamber configured to translate and rotate the fetal patient simulator with respect to the maternal patient simulator to simulate a birth. In some instances, the fetal patient simulator an internal support structure that includes a head, spinal components, left arm components, right arm components, left leg components, and right leg components with a continuous silicon skin layer covering the internal support structure.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

The accompanying drawings illustrate embodiments of the devices and methods disclosed herein and together with the description, serve to explain the principles of the present disclosure.

Each of FIGS. 14-17 provides a perspective view of a structural framework of the maternal patient simulator of FIGS. 1-6 along with the birthing mechanism of FIGS. 6-11 according to an embodiment of the present disclosure.

Each of FIGS. 18-21 provides a perspective view of the structural framework FIGS. 14-17 with an additional sublayer engaged therewith according to an embodiment of the present disclosure.

Figure 22:
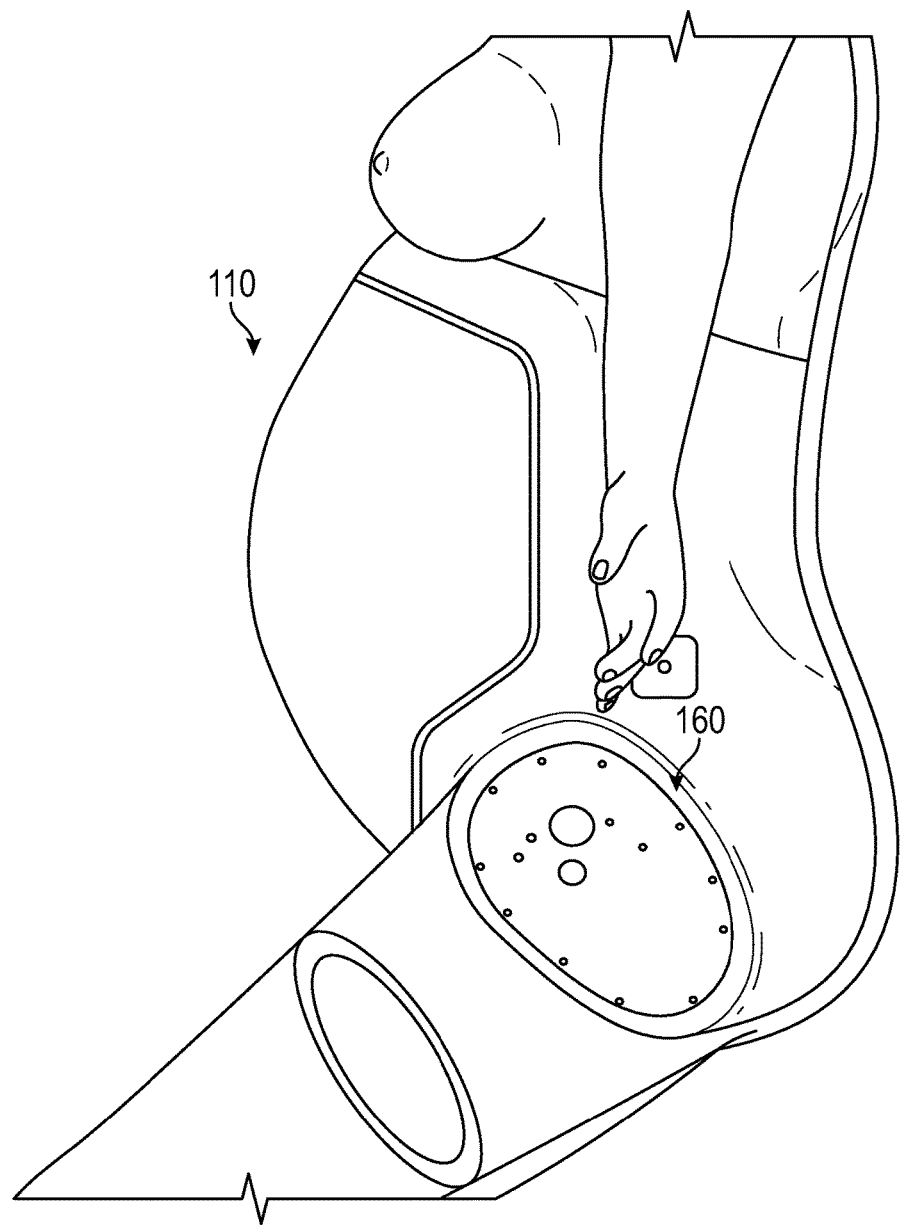

FIG. 22 is a side, partially transparent view of a portion of the maternal patient simulator of FIGS. 1-6 according to an embodiment of the present disclosure.

Figure 23:
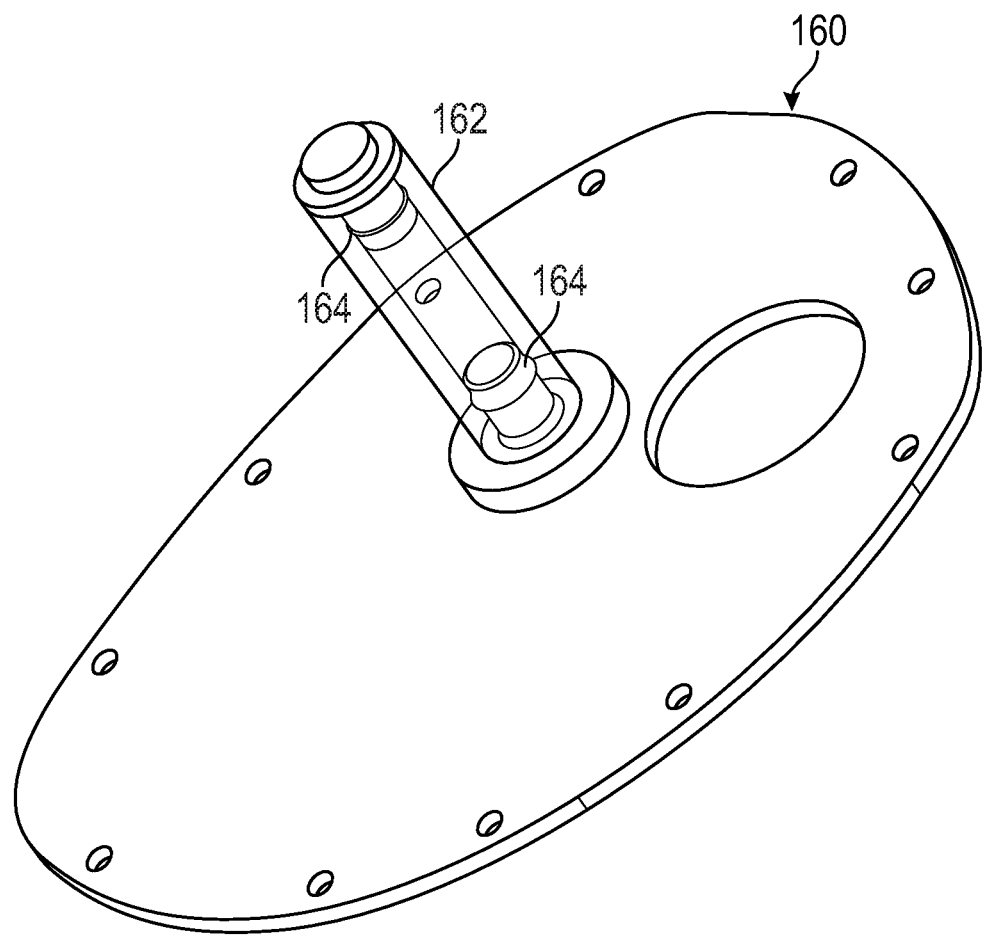

FIG. 23 is a perspective view of components of a hip joint of the maternal patient simulator of FIGS. 1-6 according to an embodiment of the present disclosure.

Figure 24:
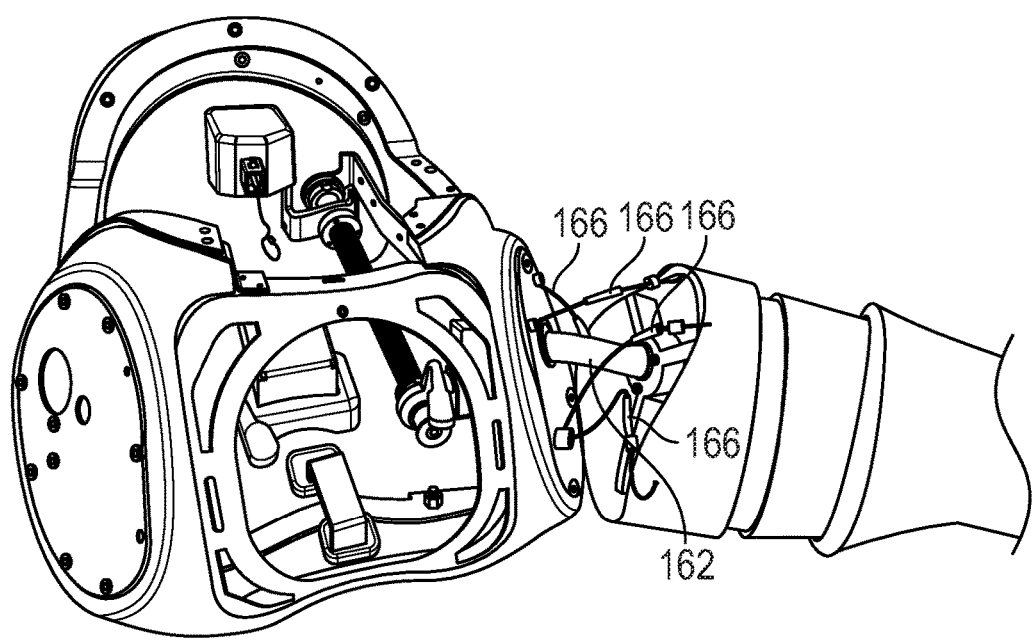

FIG. 24 is a perspective view of a hip joint of the maternal patient simulator of FIGS. 1-6 according to an embodiment of the present disclosure.

Figure 25:
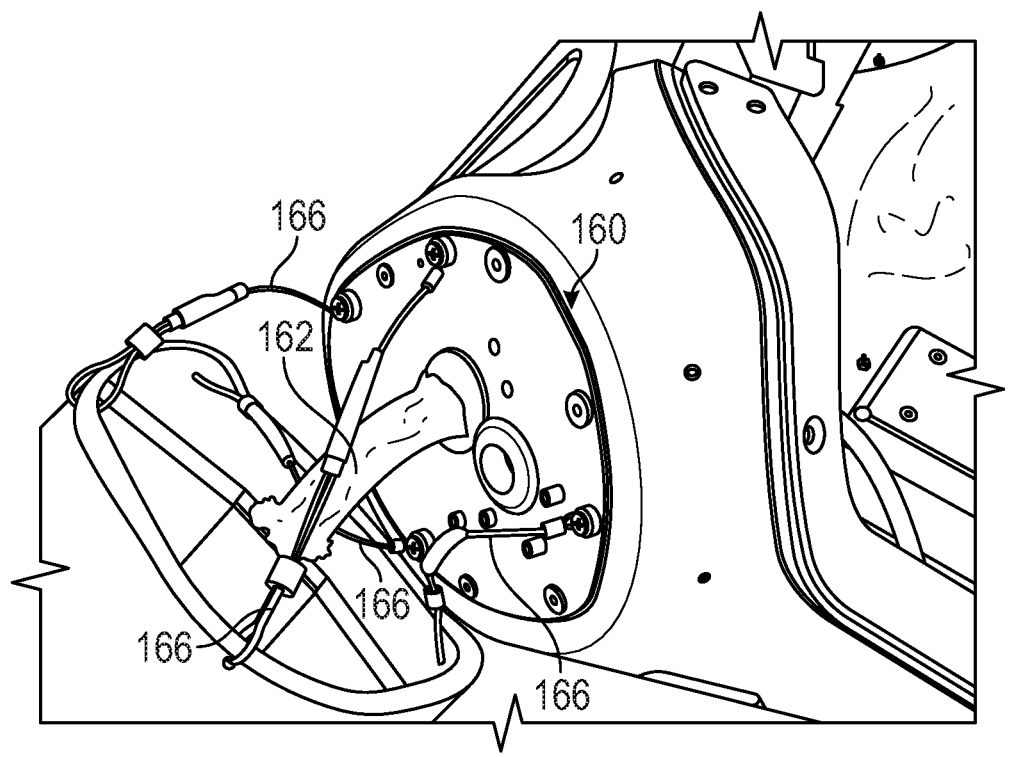

FIG. 25 is a perspective view of the hip joint of FIG. 24.

Figure 26:
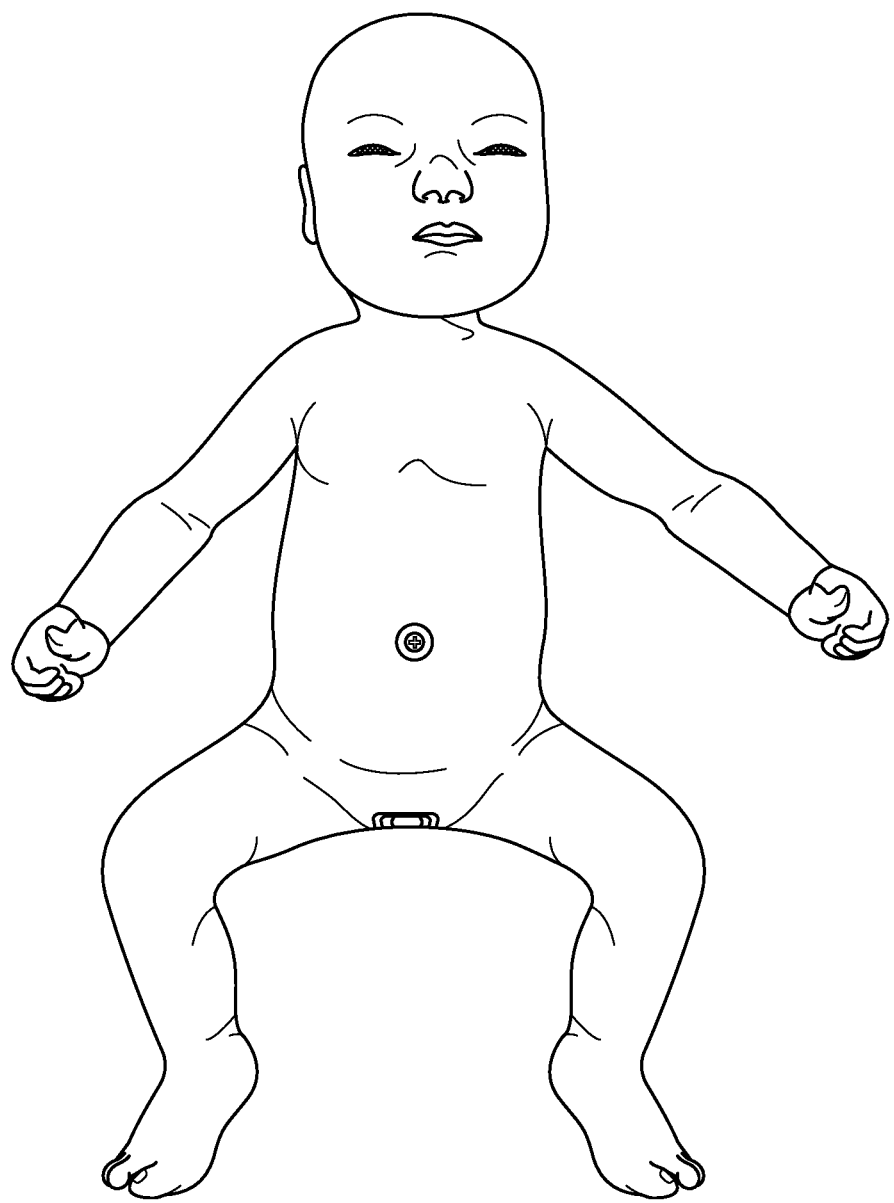

FIG. 26 is a front view of a fetal patient simulator according to an embodiment of the present disclosure.

Figure 27:
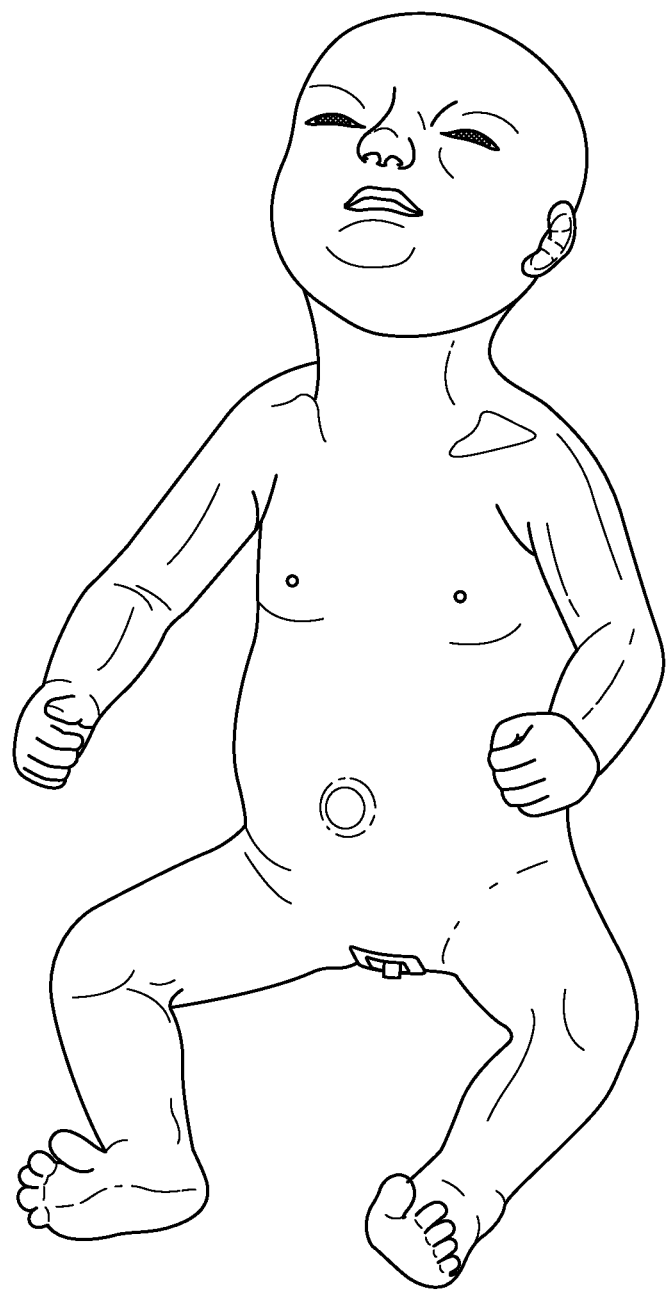

FIG. 27 is a perspective view of the fetal patient simulator of FIG. 26.

Figure 28:
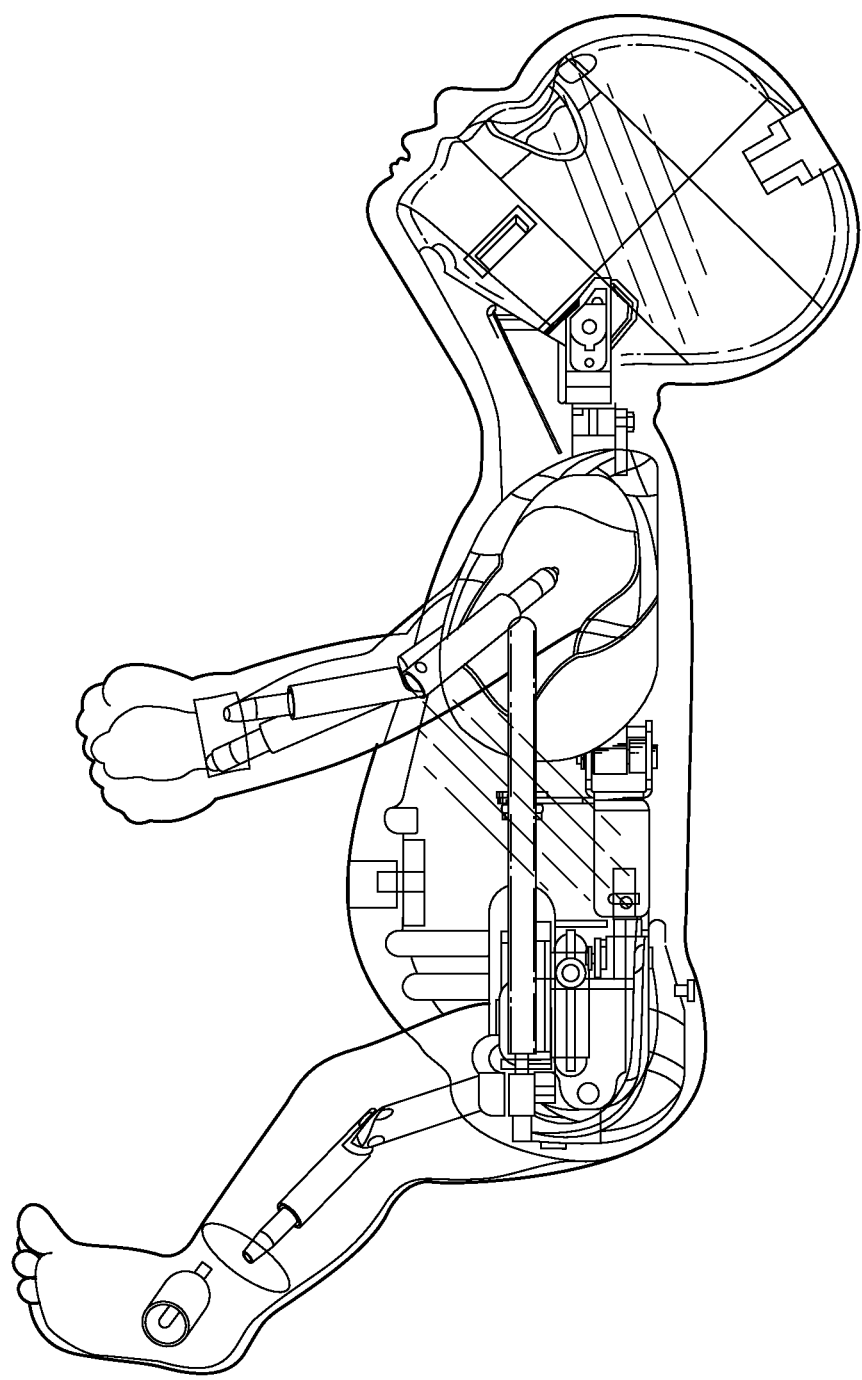

FIG. 28 is a side, partially transparent view of the fetal patient simulator of FIGS. 26 and 27.

Figure 29:
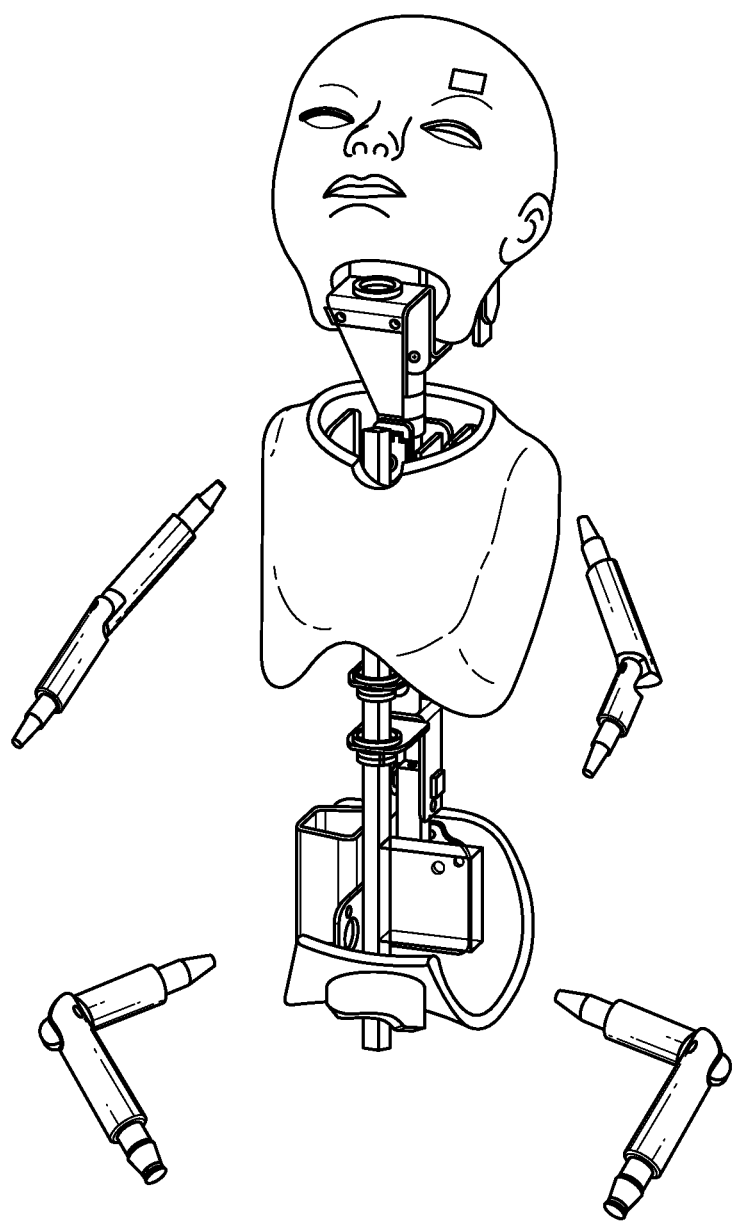

FIG. 29 is a perspective view of inner components of the fetal patient simulator of FIGS. 26-28.

Figure 30:
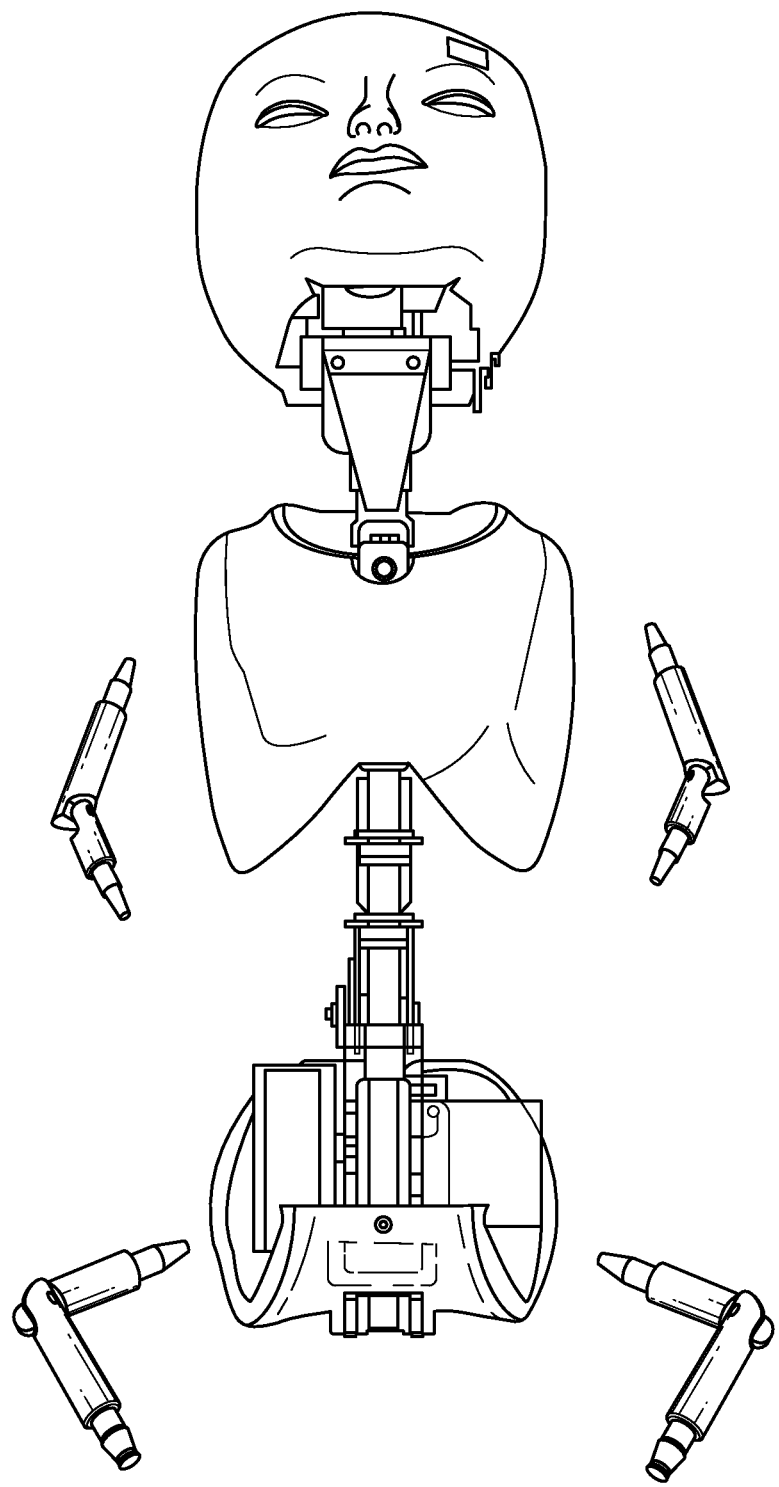

FIG. 30 is a perspective view of the inner components of the fetal patient simulator shown in FIG. 29.

Figure 31:
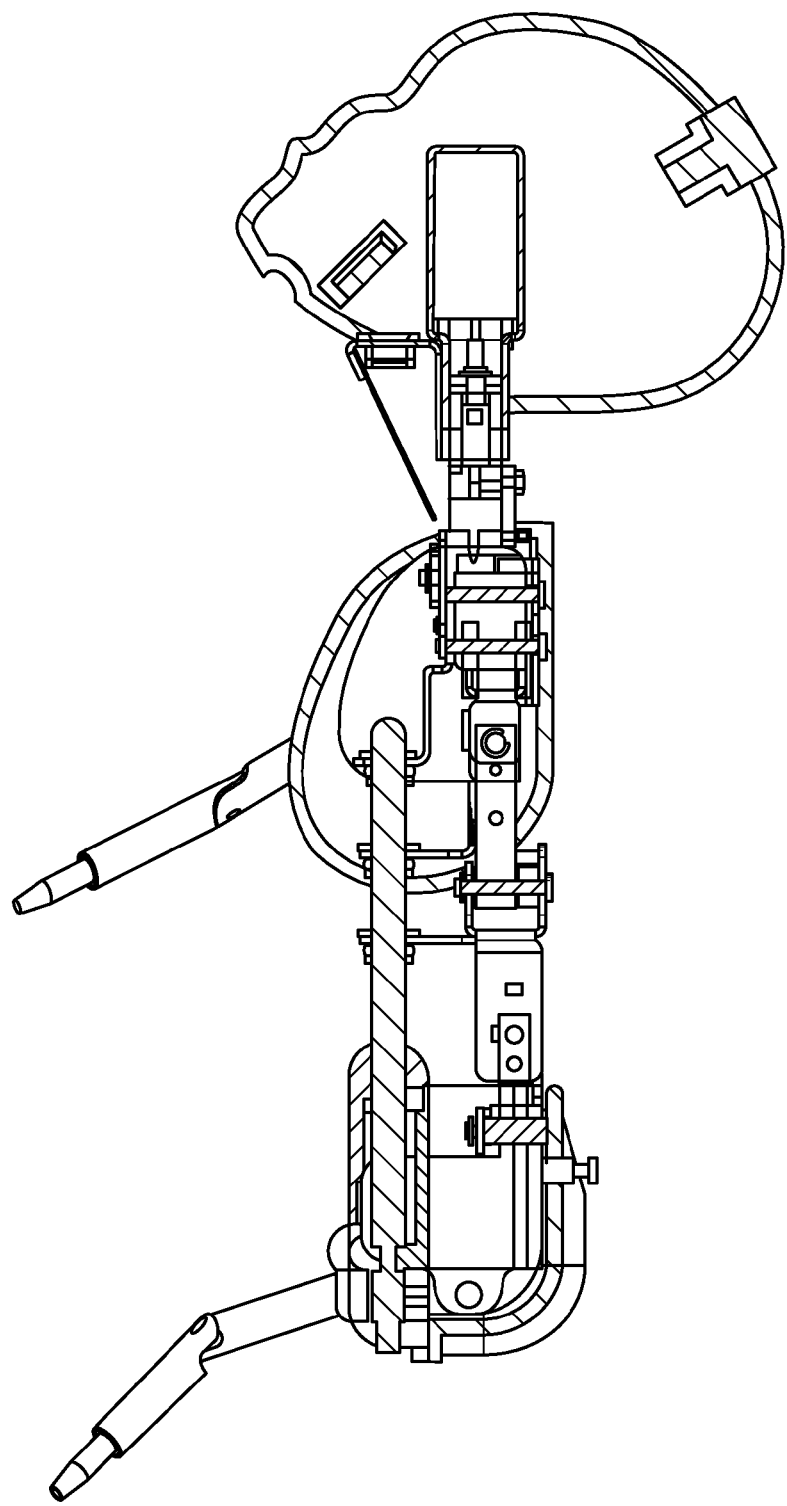

FIG. 31 is a cross-sectional side view of the inner components of the fetal patient simulator shown in FIGS. 29 and 30.

Figure 32:
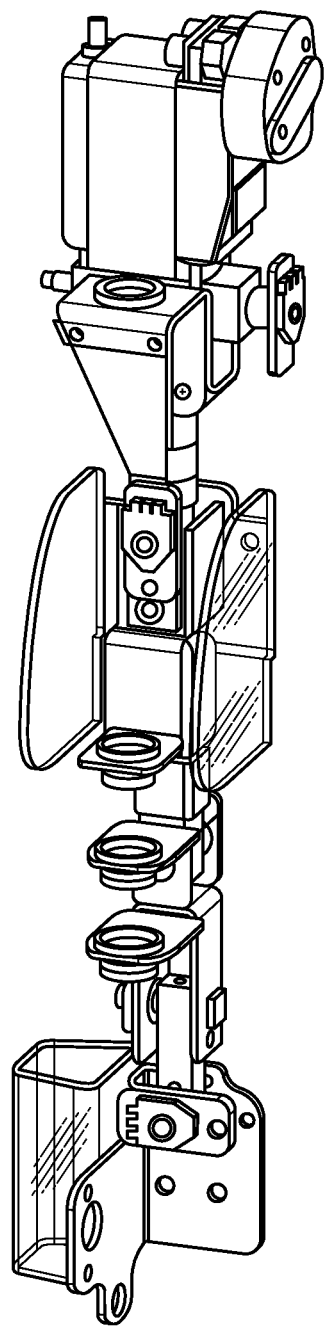

FIG. 32 is a perspective view of a spinal structure of the fetal patient simulator of FIGS. 26-31 according to an embodiment of the present disclosure.

Figure 33:
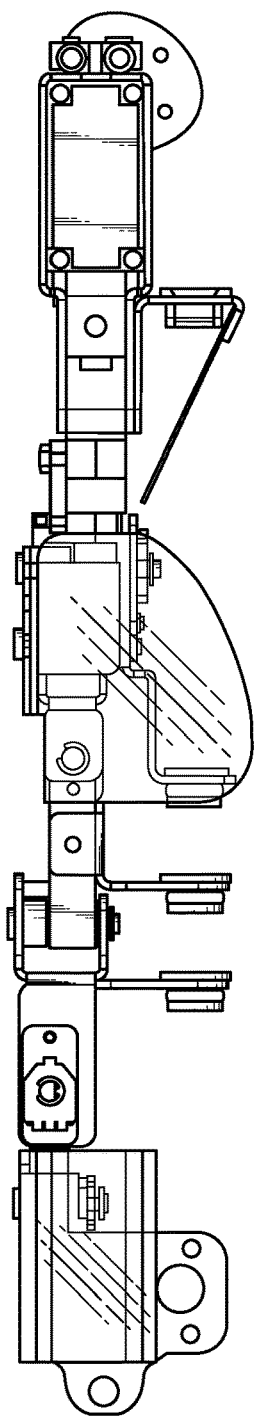

FIG. 33 is a side view of the spinal structure of FIG. 32.

Figure 34:
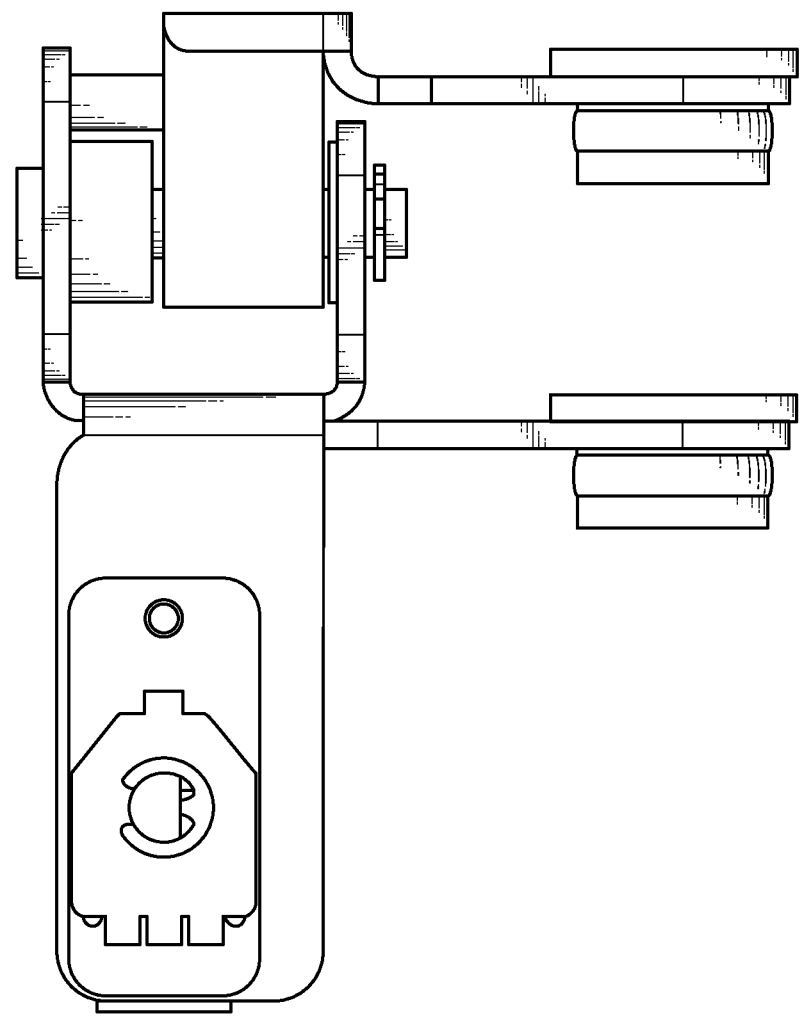

FIG. 34 is a front view of a joint of the spinal structure of FIGS. 32 and 33 that includes an encoder.

Figure 35:
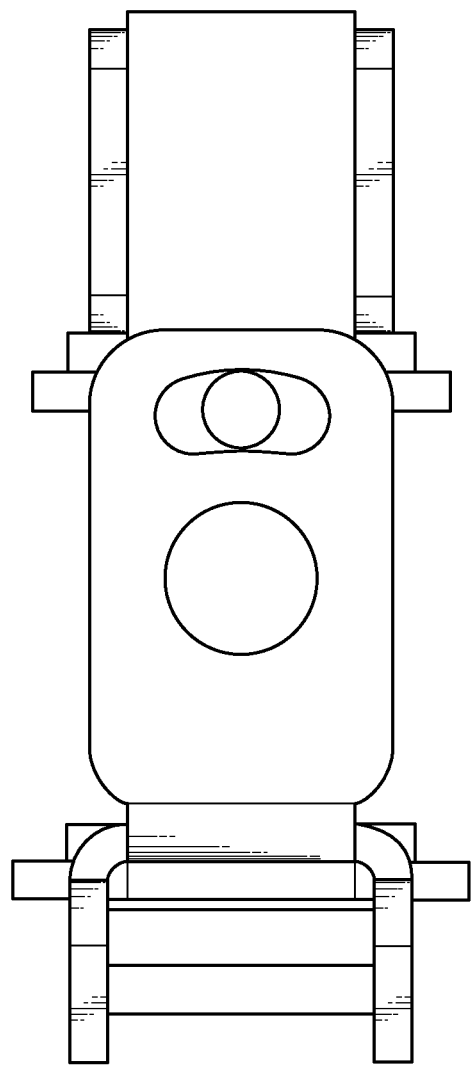

FIG. 35 is a front view of a joint of the spinal structure of FIGS. 32 and 33 that does not include an encoder.

Figure 36:
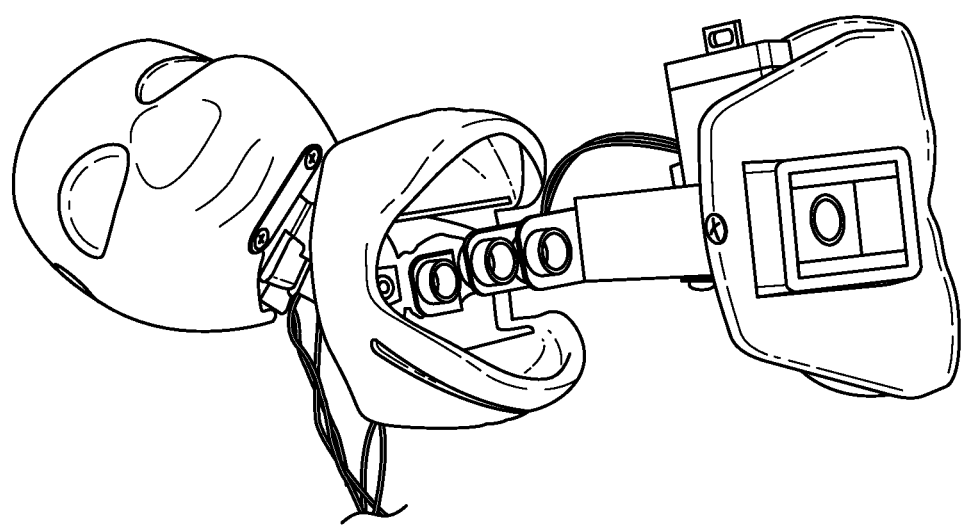

FIG. 36 is a perspective view of a partially assembled fetal patient simulator according to an embodiment of the present disclosure.

Figure 37:
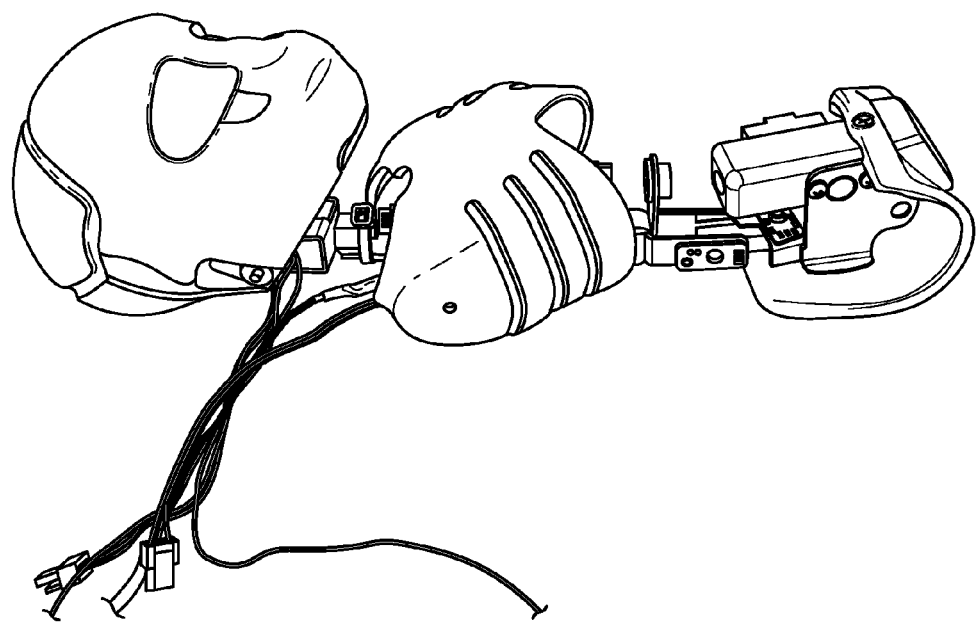

FIG. 37 is another perspective view of the partially assembled fetal patient simulator of FIG. 36.

Figure 38:
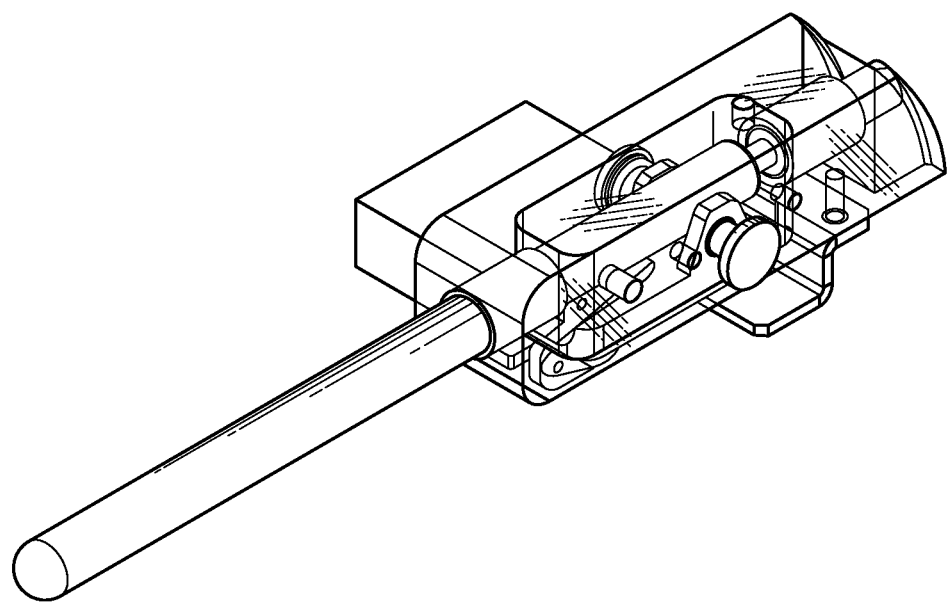

FIG. 38 is a perspective, partially transparent view of a locking mechanism of the fetal patient simulator of FIGS. 27-31 engaged with a stiffening rod according to an embodiment of the present disclosure.

Figure 39:
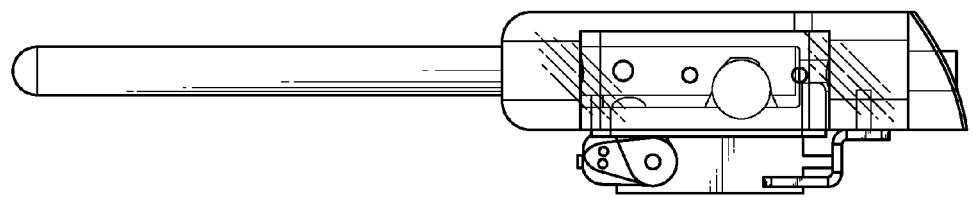

FIG. 39 is a side, partially transparent view of the locking mechanism and stiffening rod of FIG. 38.

Figure 40:
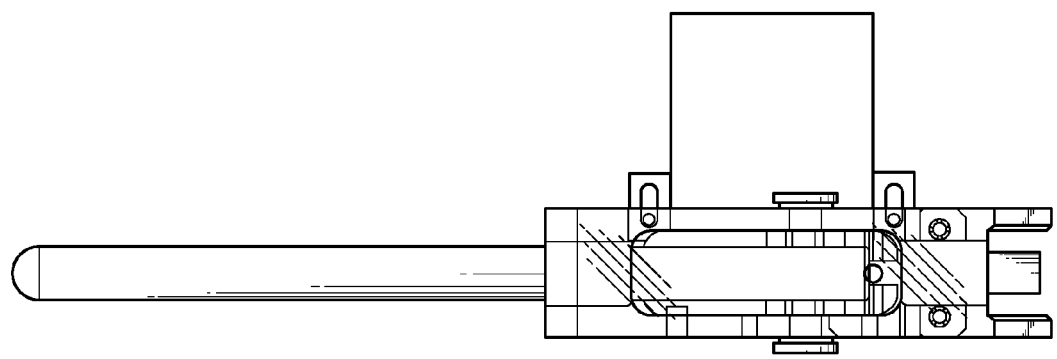

FIG. 40 is a top, partially transparent view of the locking mechanism and stiffening rod of FIGS. 38 and 39.

Figure 41:
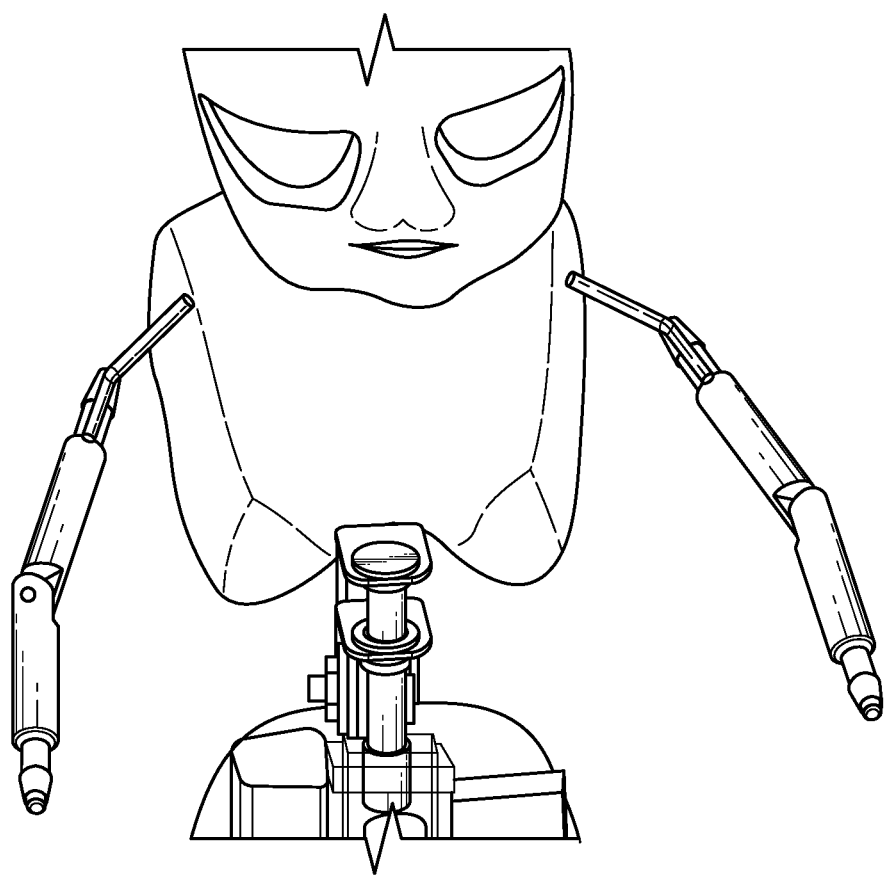

FIG. 41 is a perspective view of a section of inner components of the fetal patient simulator of FIGS. 26-31 showing aspects of the arms of the fetal patient simulator according to an embodiment of the present disclosure.

Figure 42:
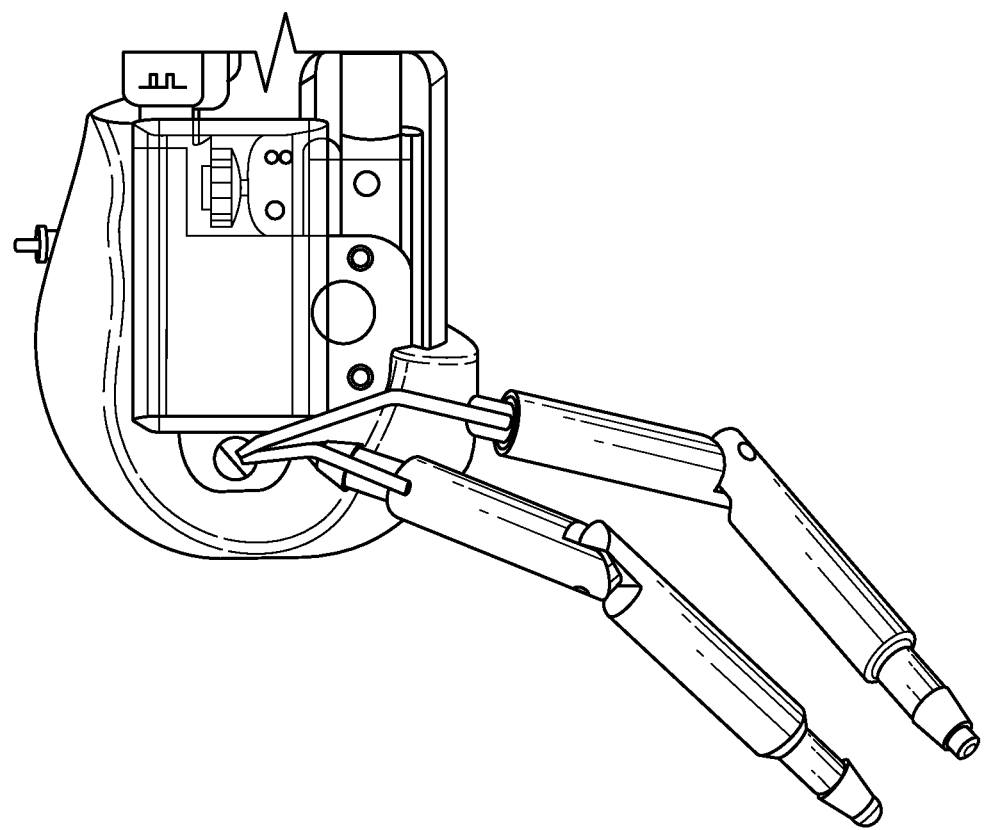

FIG. 42 is a perspective view of a section of inner components of the fetal patient simulator of FIGS. 26-31 showing aspects of the legs of the fetal patient simulator according to an embodiment of the present disclosure.

Figure 43:
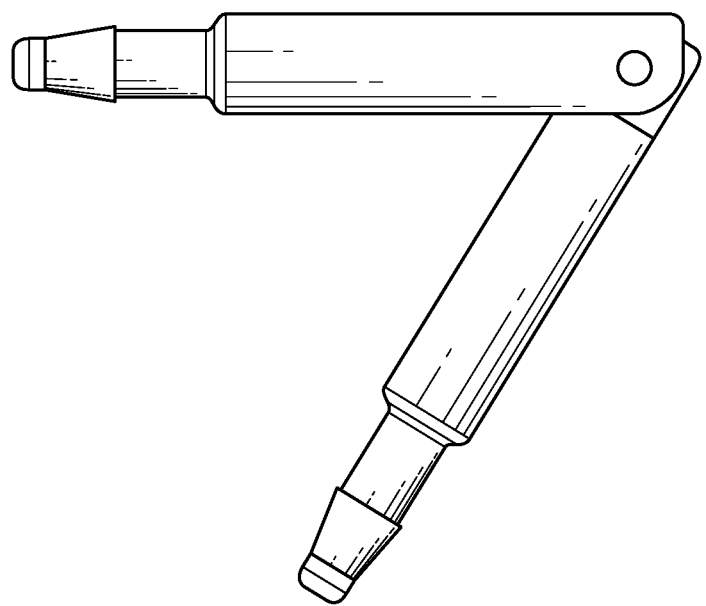

FIG. 43 is a perspective view of an elbow or knee joint of a fetal patient simulator according to an embodiment of the present disclosure.

Figure 44:
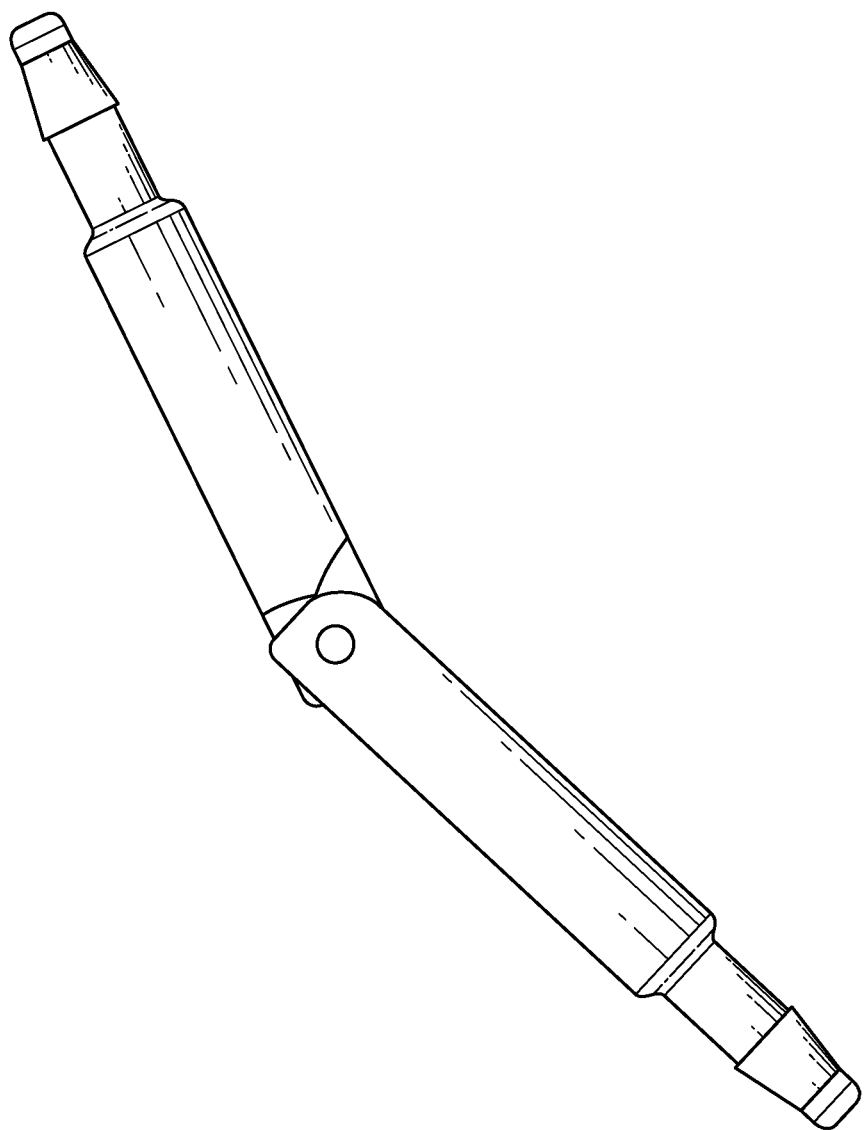

FIG. 44 is a perspective view of the elbow or knee joint of FIG. 43 shown in an extended configuration.

Figure 45:
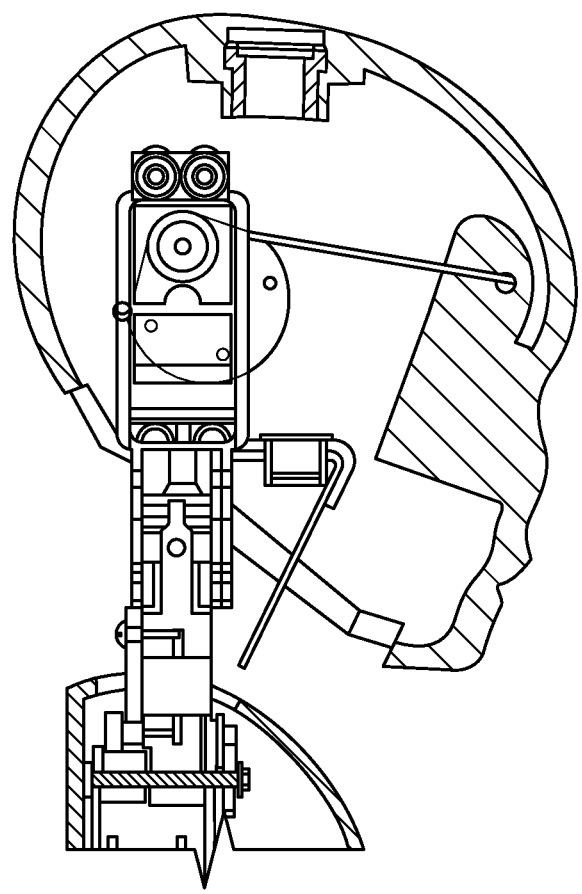

FIG. 45 is a side, cross-sectional view of a head of the fetal patient simulator of FIGS. 26-31 with the head in a neutral position.

Figure 46:
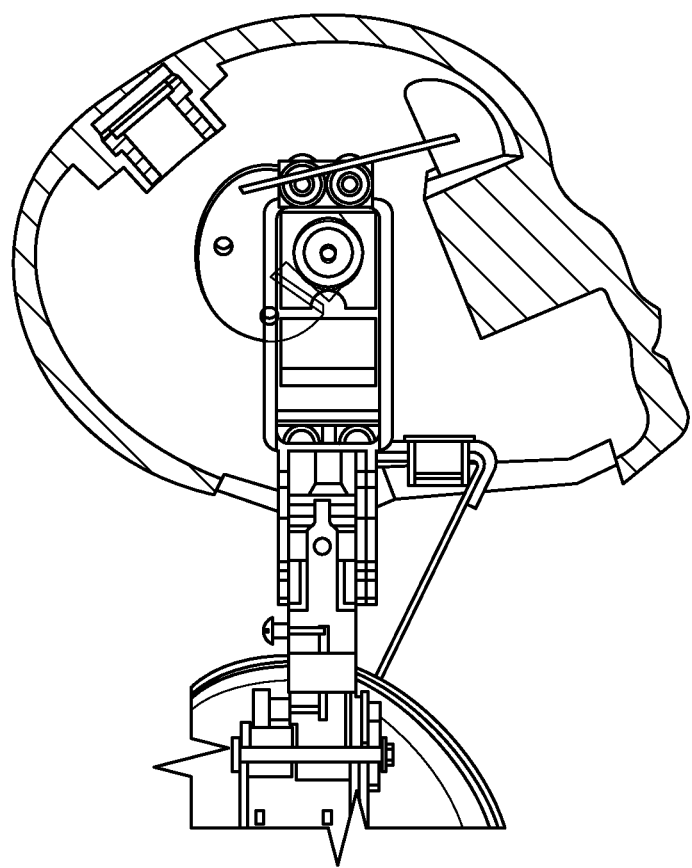

FIG. 46 is a side, cross-sectional view of the head of FIG. 45, but showing the head in a raised position.

Figure 47:
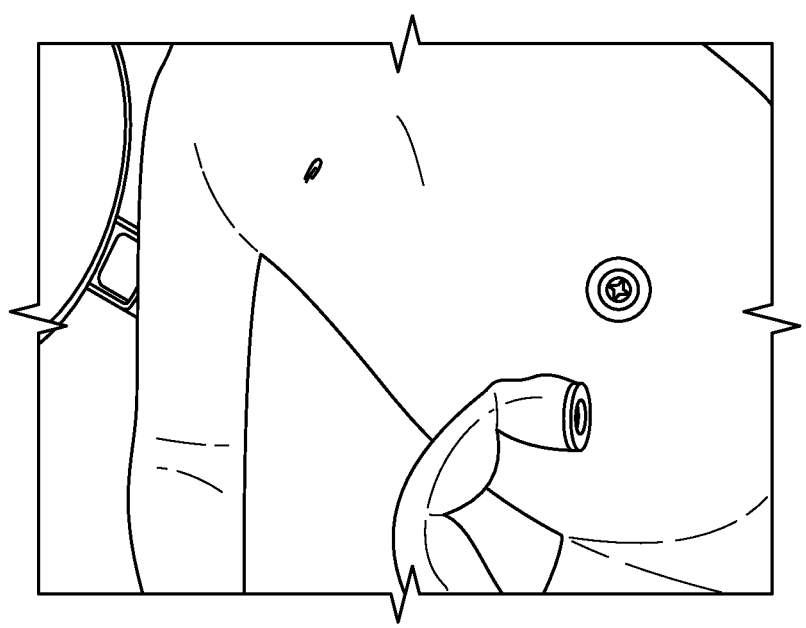

FIG. 47 is a perspective view of a torso of the fetal patient simulator of FIGS. 26-31 shown with an umbilical cord configured to be attached to a belly button of the fetal patient simulator according to an embodiment of the present disclosure.

Figure 48:
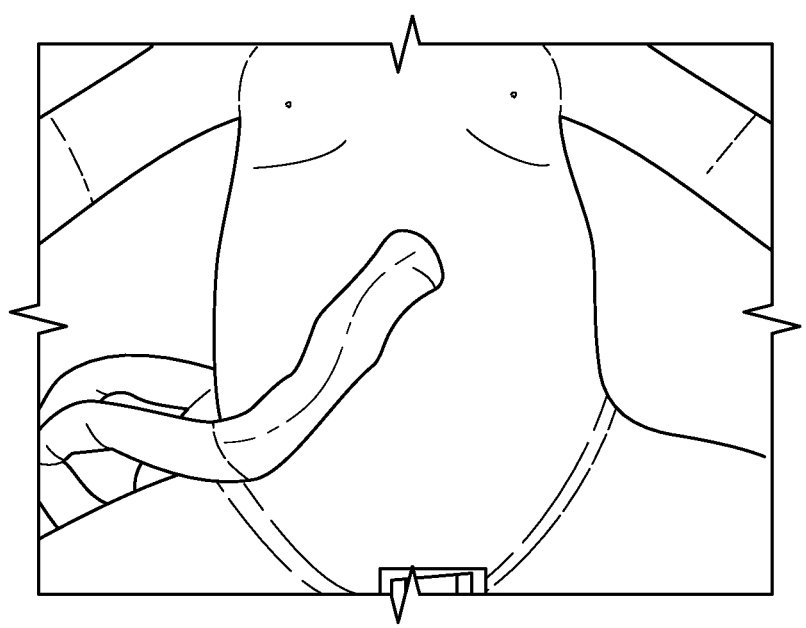

FIG. 48 is a perspective view of the torso and umbilical cord of FIG. 47, but with the umbilical attached to the belly button of the fetal patient simulator.

Figure 49:
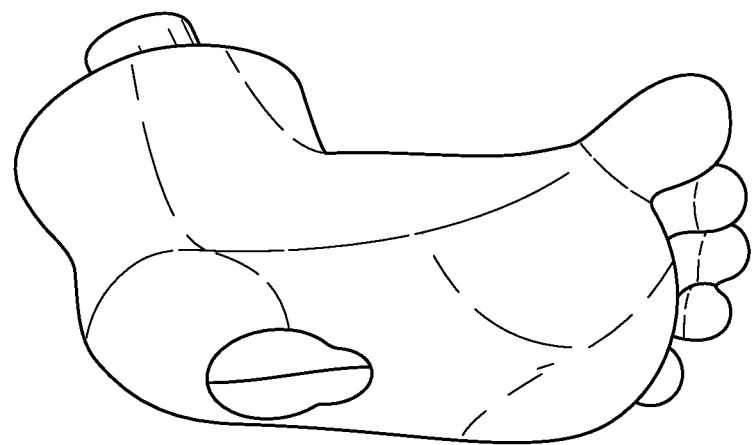

FIG. 49 is a perspective view of a foot of the fetal patient simulator of FIGS. 26-31 according to an embodiment of the present disclosure.

Figure 50:
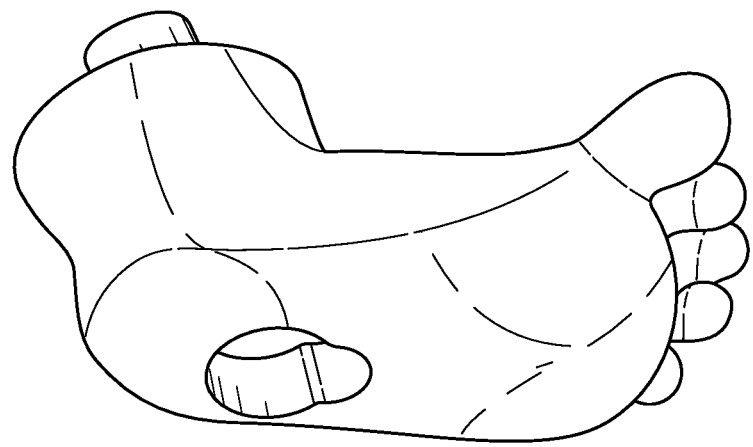

FIG. 50 is a perspective view of the foot of FIG. 49 with a plug cover removed.

Figure 51:
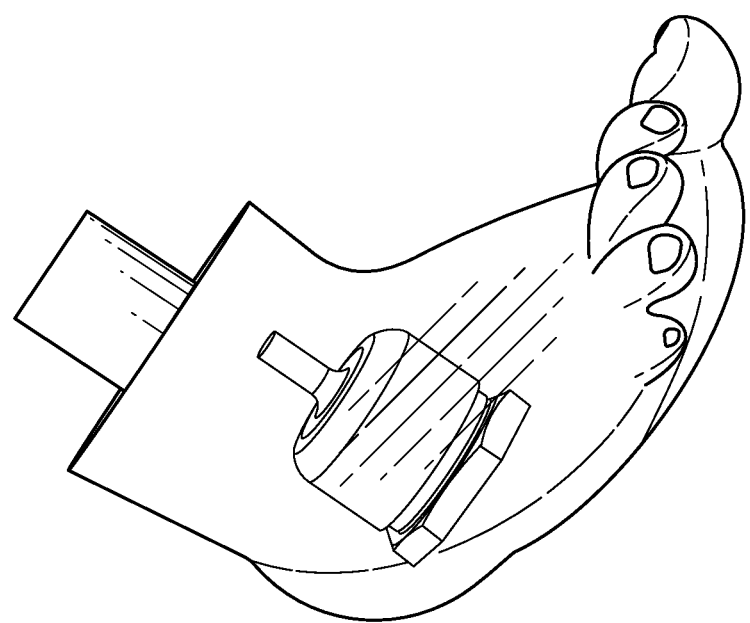

FIG. 51 is a perspective, partially transparent view of the foot of FIGS. 49 and 50 showing a communication and/or power port disposed therein according to an embodiment of the present disclosure.

Figure 52:
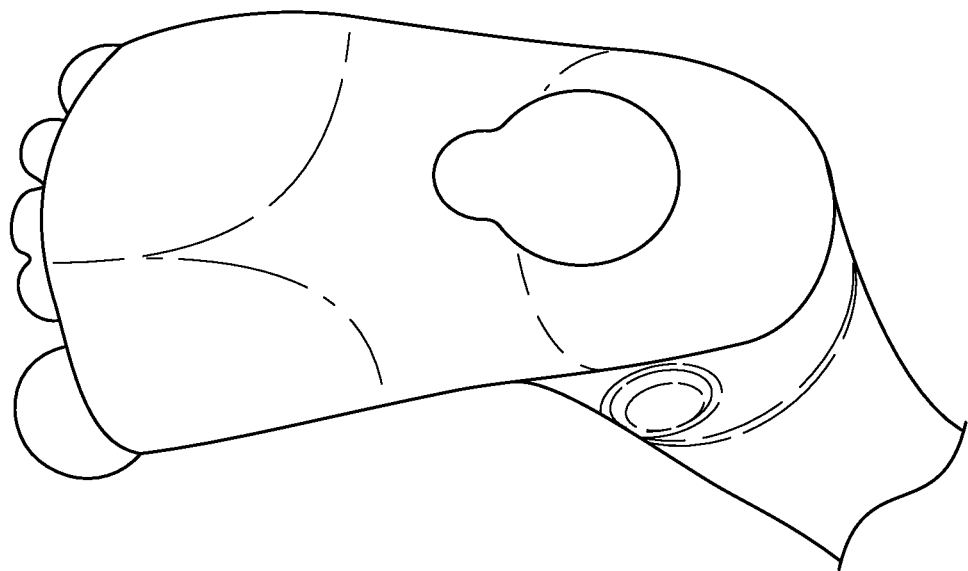

FIG. 52 is a bottom view of the foot of FIGS. 49-51 with the plug cover in place.

Figure 53:
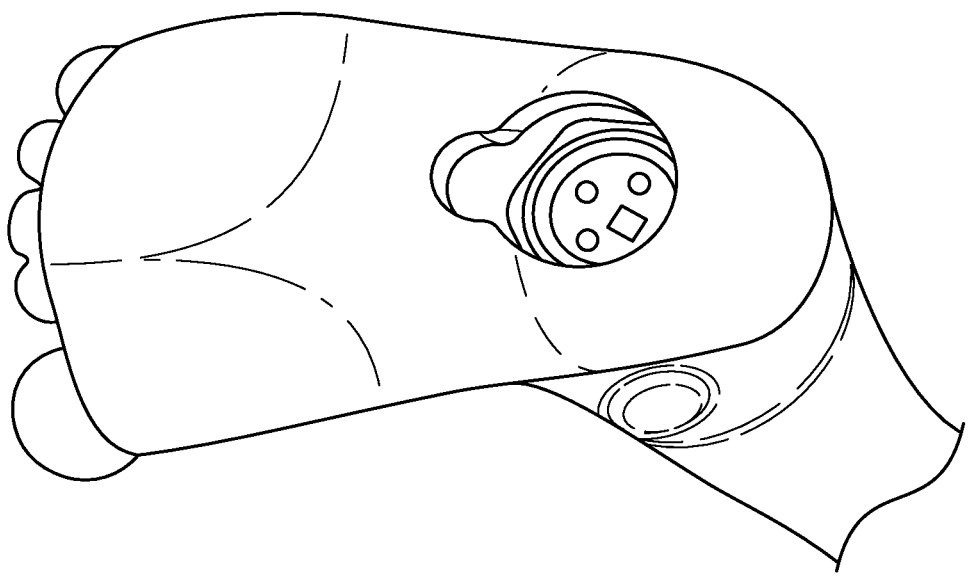

FIG. 53 is a bottom view of the foot of FIGS. 49-52 with the plug cover removed to provide access to the communication and/or power port.

DETAILED DESCRIPTION OF PREFERRED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. For simplicity, in some instances the same reference numbers are used throughout the drawings to refer to the same or like parts.

One of the aims of healthcare simulation is to establish a teaching environment that closely mimics key clinical cases in a reproducible manner. The introduction of high fidelity tetherless simulators, such as those available from Gaumard Scientific Company, Inc., over the past few years has proven to be a significant advance in creating realistic teaching environments. The present disclosure is directed to a patient simulator system that expands the functionality of the simulators by increasing the realism of the look, feel, and functionality of the simulators that can be used to train medical personnel in a variety of clinical situations. The patient simulator systems disclosed herein offers a training platform on which team-building scenarios can be performed for the development of medical treatment skills and the advancement of patient safety.

In particular, the patient simulator system disclosed herein includes a maternal patient simulator and associated fetal patient simulator that have improved realism and functionality compared to previously available simulators. Some of the various features that facilitate the improved realism and functionality are described in detail below. The patient simulator systems of the present disclosure allow users to practice a range of different simulated birthing scenarios. Thus, the patient simulator system facilitates the training of user's across the range of birthing scenarios and corresponding assessment of the user's response to the different simulated birthing scenarios. Accordingly, the user's medical treatment skills can be obtained and/or improved in a simulated environment without endangering a live patient.

Moreover, the patient simulator system allows for multiple users to simultaneously work with the patient simulator during a particular birthing scenario, thereby facilitating team training and assessment in a realistic, team-based environment. By allowing multiple users to simultaneously interact with the patient simulator system, the system facilitates the real-time training and assessment of the cooperative efforts of an OB/GYN team in a wide variety of birthing scenarios and patient safety scenarios, such as, by way of non-limiting example, a fire in the hospital. In some embodiments, the patient simulator system provides for pre-operative care simulation as well as post-operative care simulation, thereby allowing users to experience, address, and assess pre-operative and post-operative management, including pre-operative acquisition of the patient history and management of post-operative complications.

For example, in some embodiments, the patient simulator system allows for the realistic reception and transport of the patient simulator through a hospital (e.g., from an emergency room to an operating room) during operation of a particular birthing scenario. In addition, the patient simulator systems can be used to conduct patient safety drills in an actual hospital or other medical setting.

In some embodiments, the patient simulator system includes features designed to enhance the educational experience. For example, in some embodiments, the system includes a processing module to simulate different medical and/or surgical scenarios during operation of the patient simulator system. In some embodiments, the system includes a camera system that allows visualization of the procedure for real-time video and log capture for debriefing purposes. In some embodiments, the patient simulator system is provided with a workbook of medical scenarios that are pre-programmed in an interactive software package, thereby providing a platform on which team-building scenarios can be performed for the development of medical treatment skills and general patient safety. Thus, the patient simulator system disclosed herein provides a system that is readily expandable and updatable without large expense and that enables users to learn comprehensive medical and surgical skills through "hands-on" training, without sacrificing the experience gained by users in using standard surgical instruments in a simulated patient treatment situation.

Figure 1:
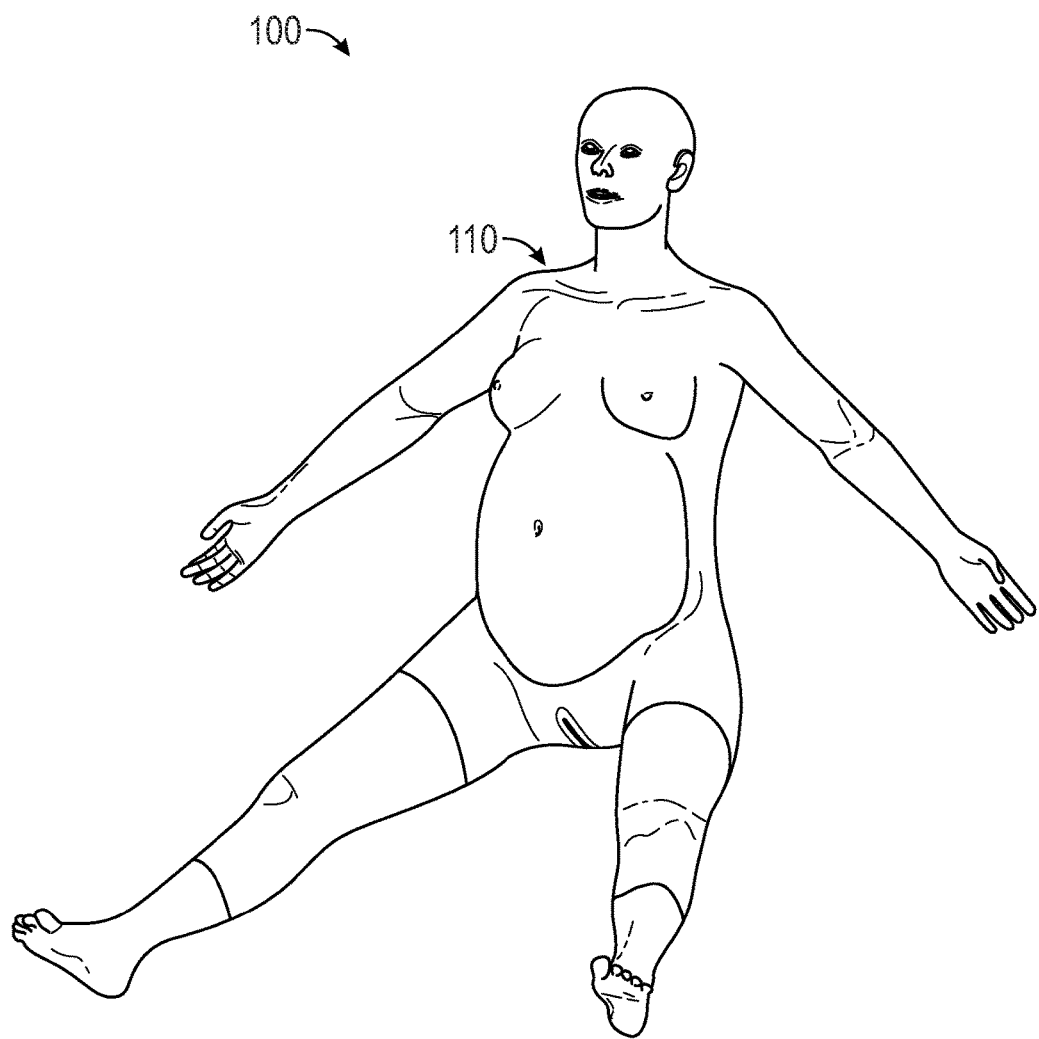
FIG. 1 is a perspective view of an exemplary maternal patient simulator according to an embodiment of the present disclosure.
Figure 2:
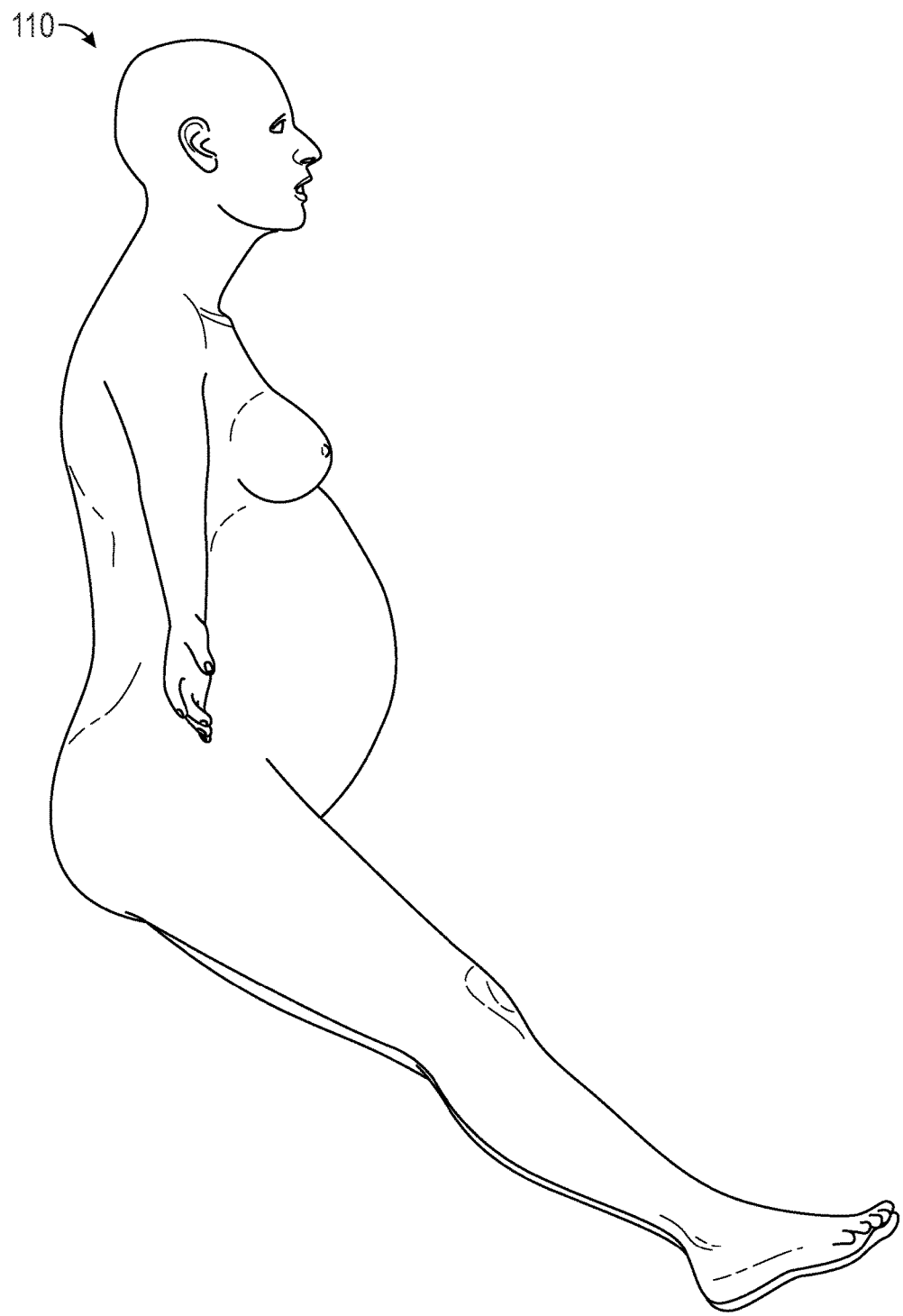
FIG. 2 is a side view of the maternal patient simulator of FIG. 1.
Figure 3:
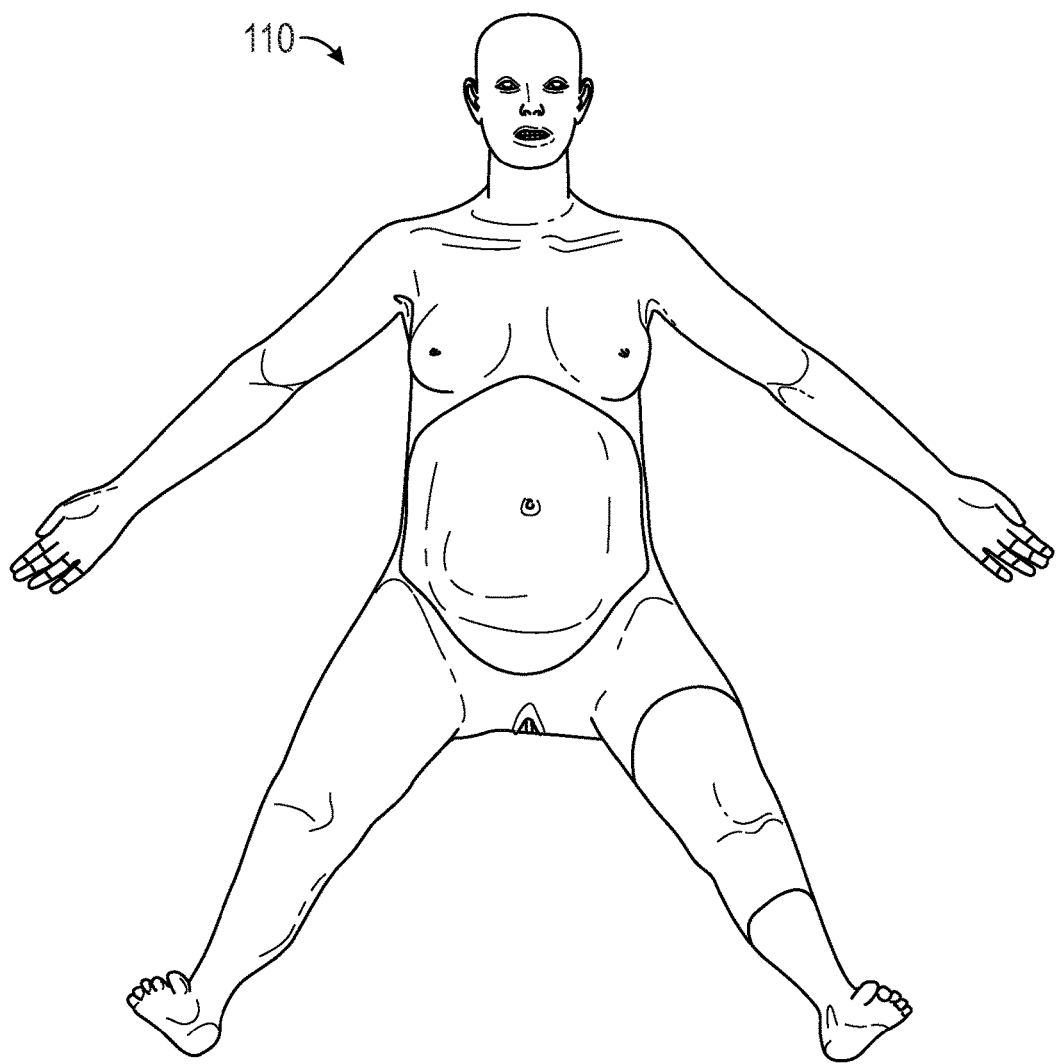
FIG. 3 is a front view of the maternal patient simulator of FIGS. 1 and 2.
Figure 12:
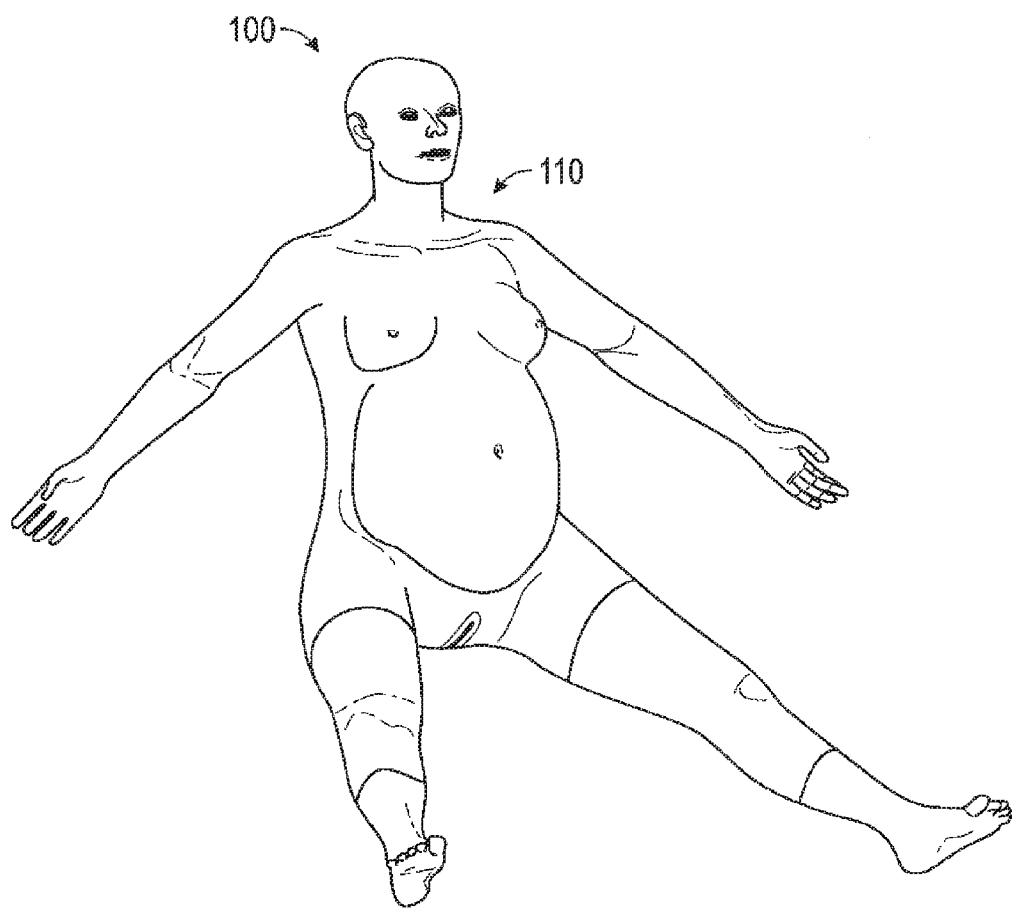
FIG. 12 is a perspective view of an exemplary maternal patient simulator according to an embodiment of the present disclosure.
Figure 13:
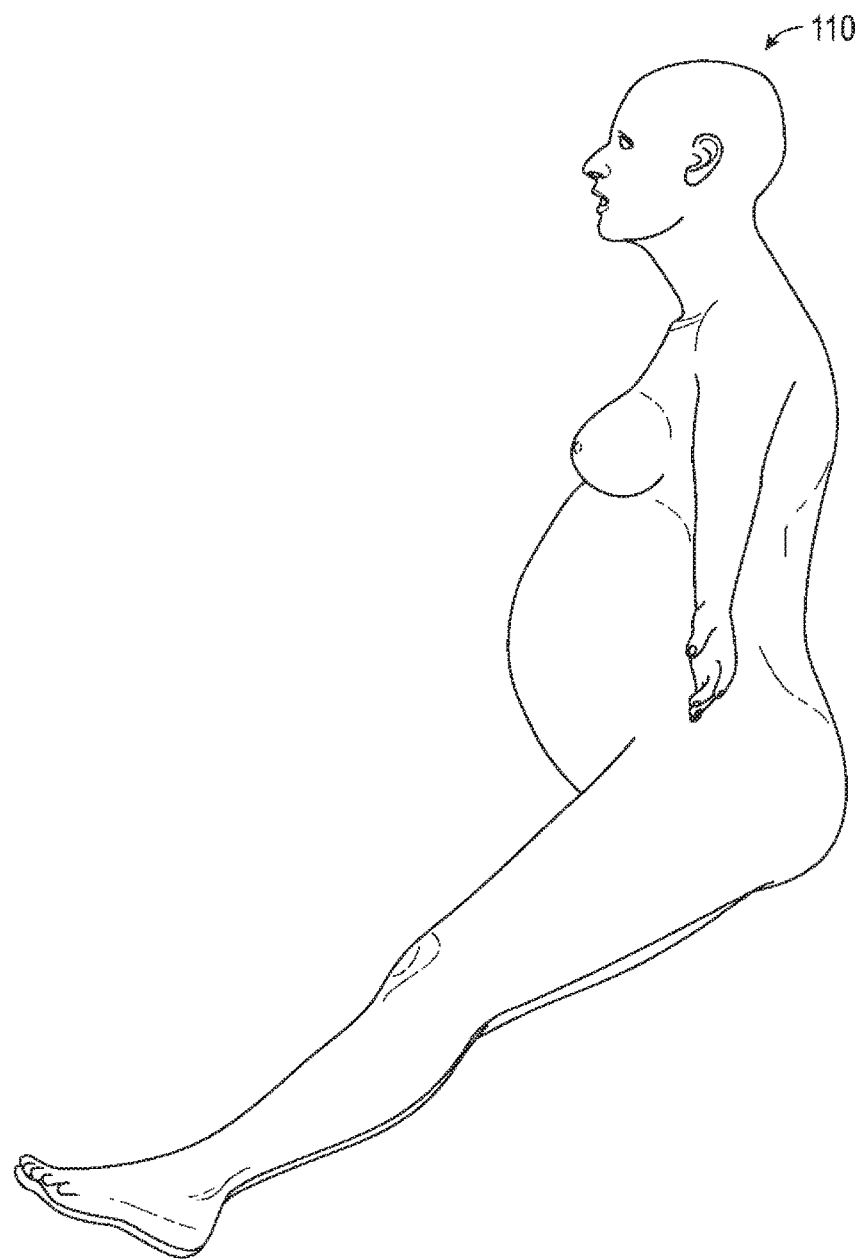
FIG. 13 is a side view of the maternal patient simulator of FIG. 1.
Figure 14:
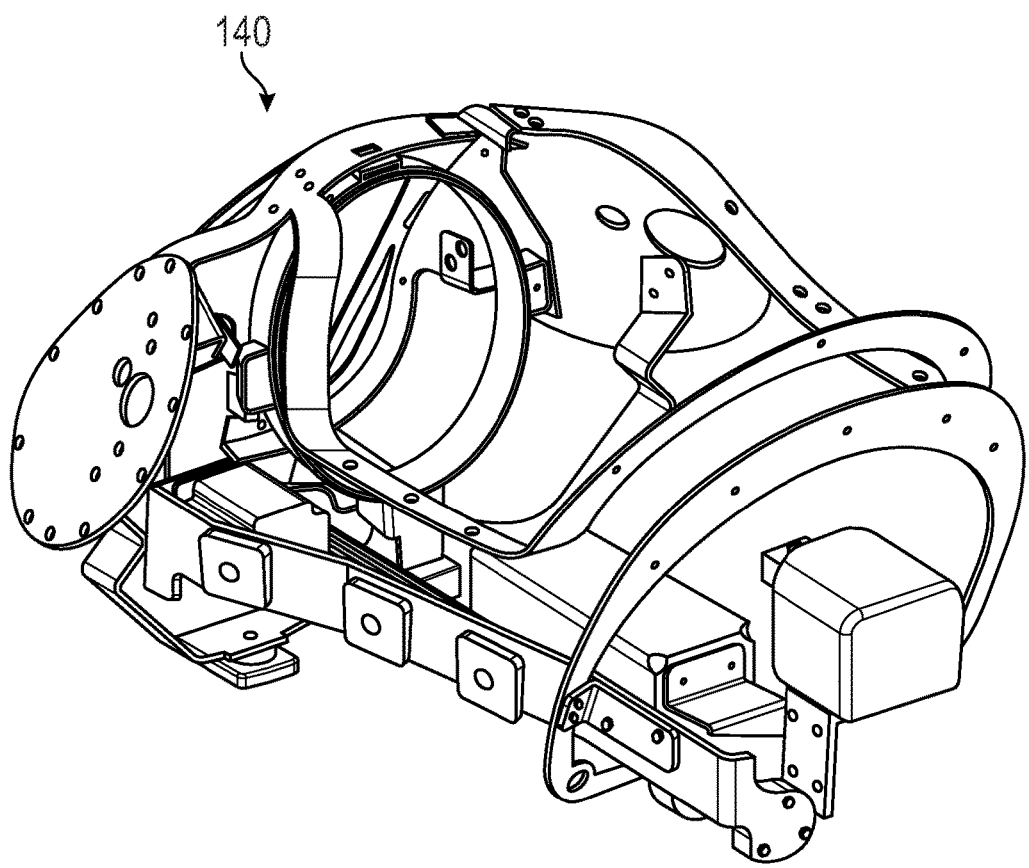
Figure 15:
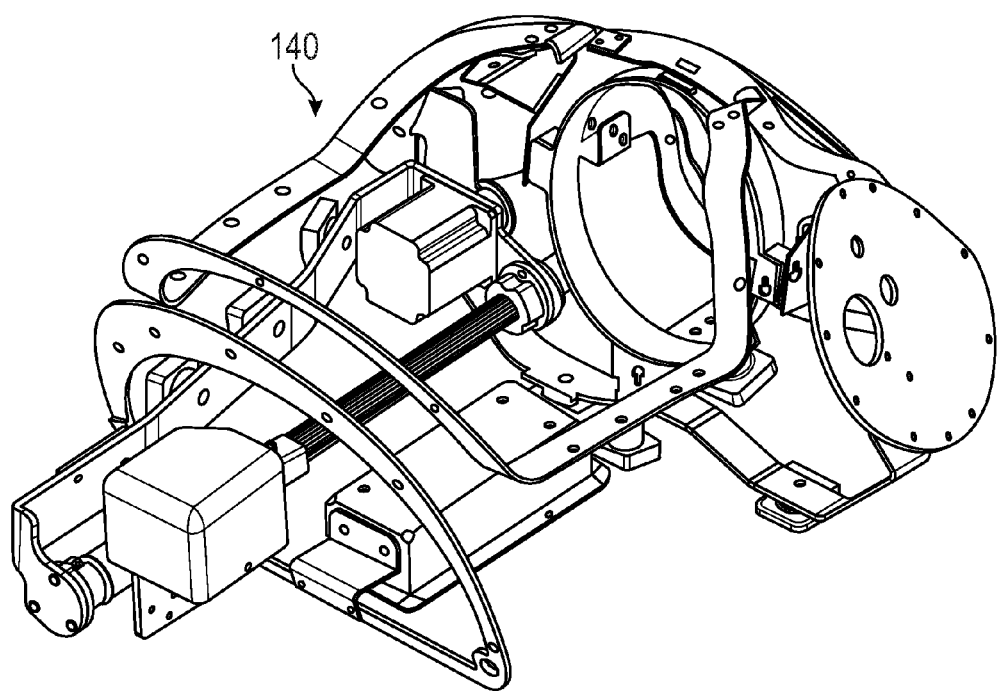
Figure 16:
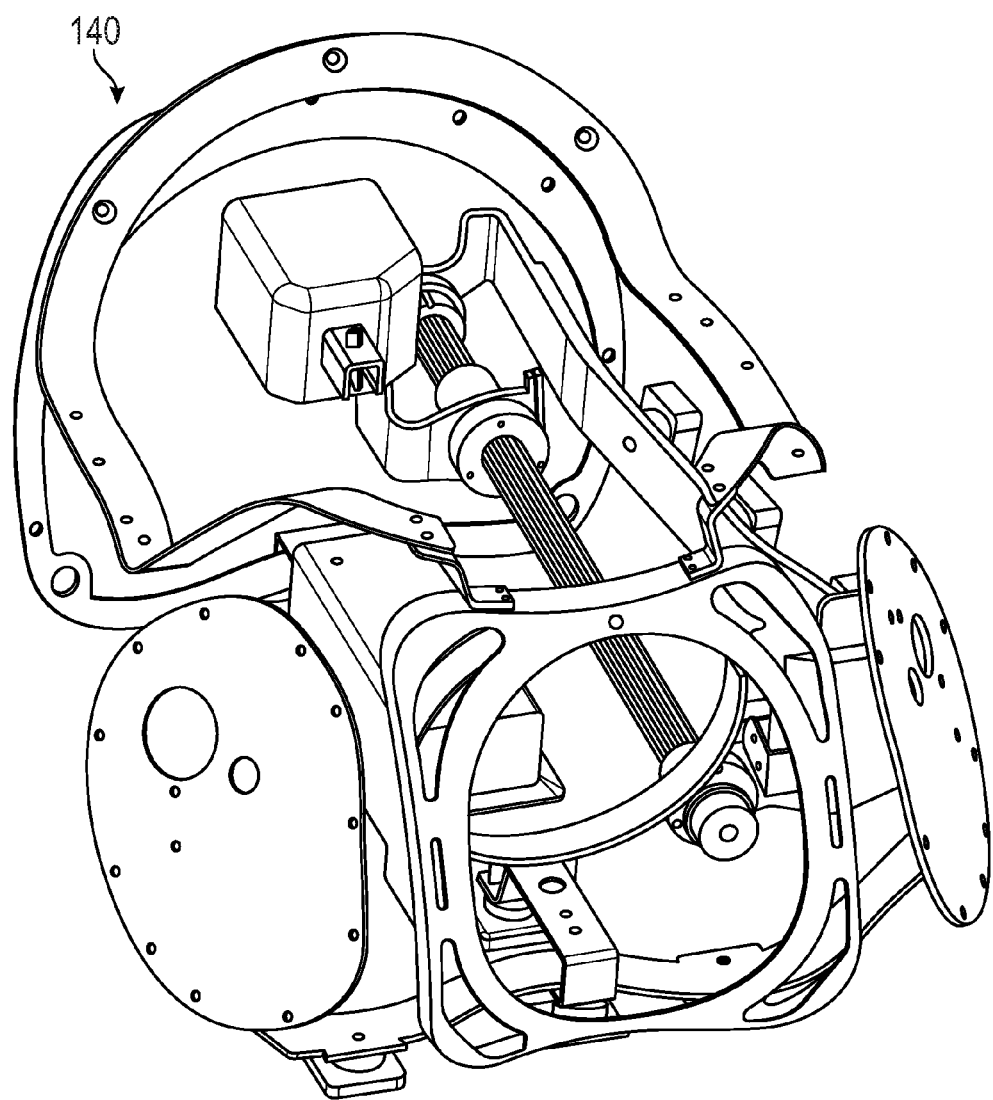
Figure 17:
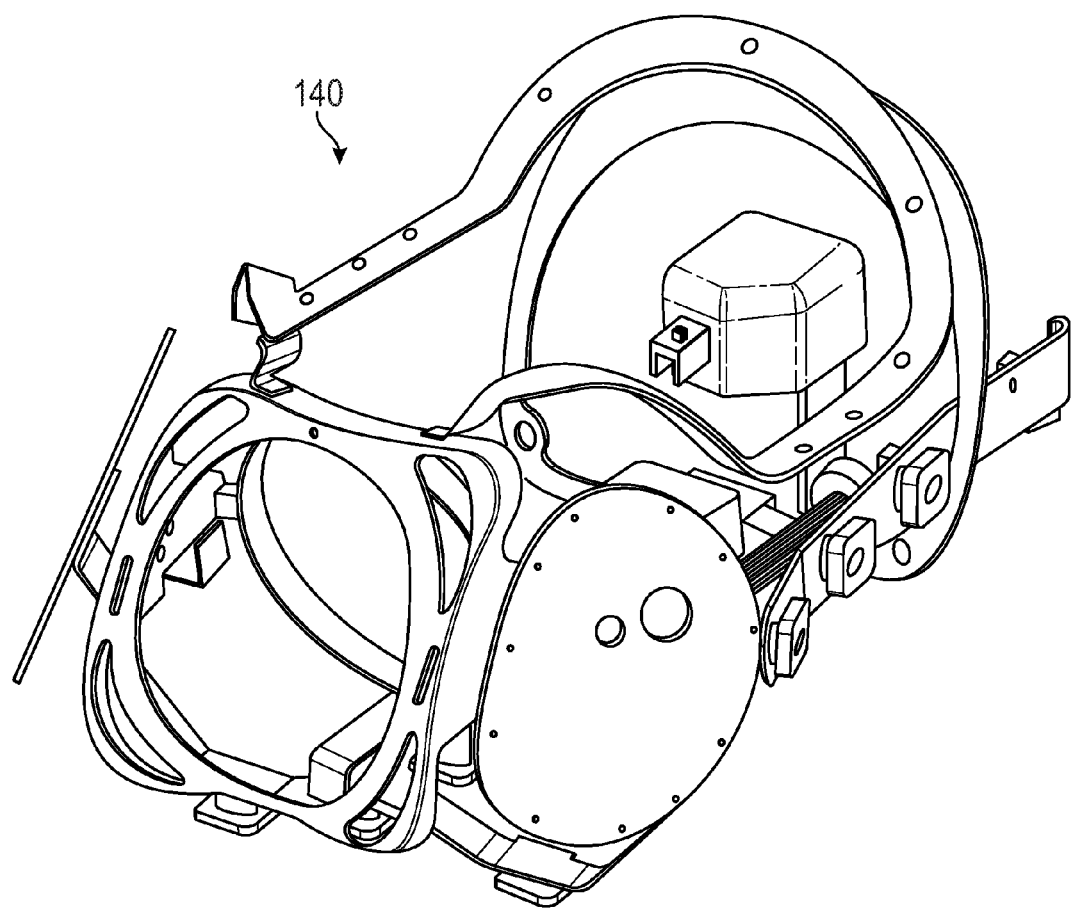
Figure 18:
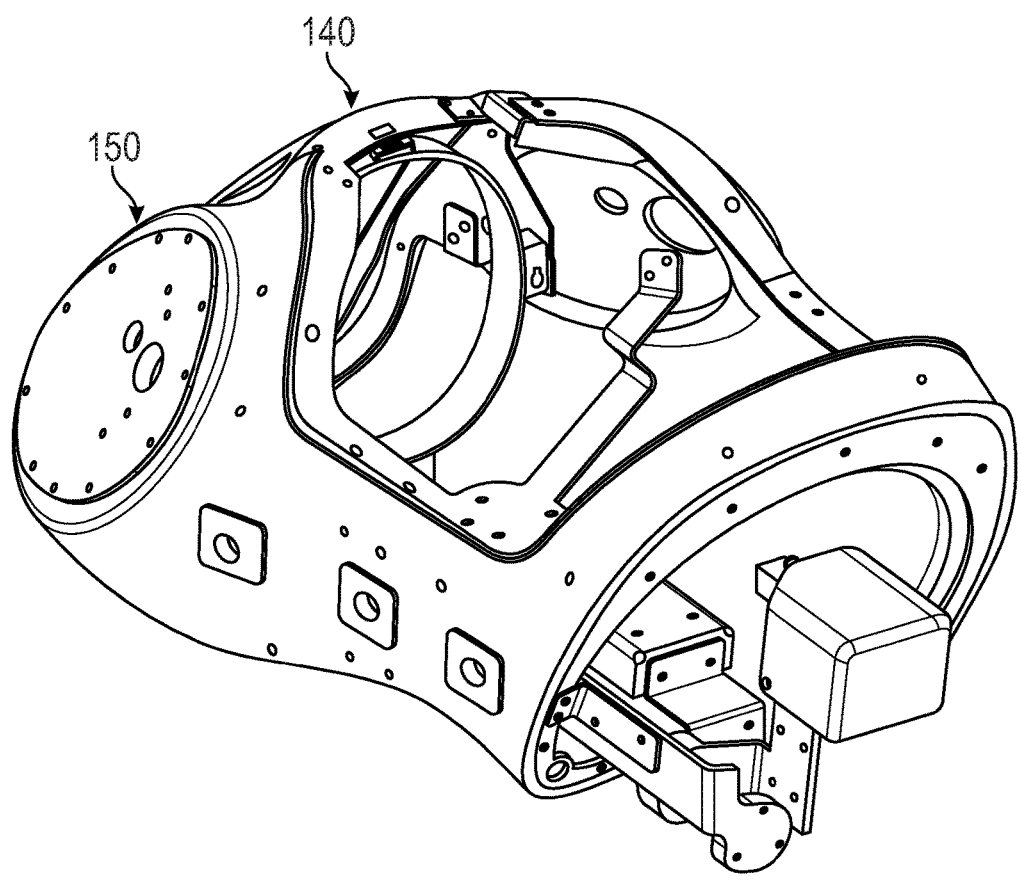
Figure 19:
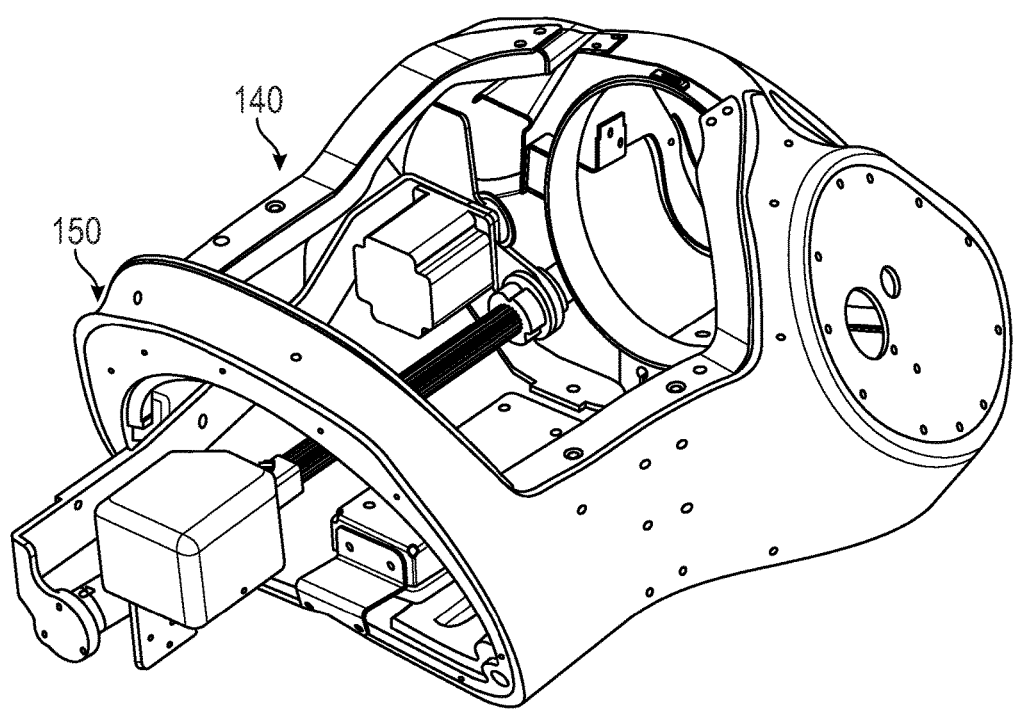
Figure 20:
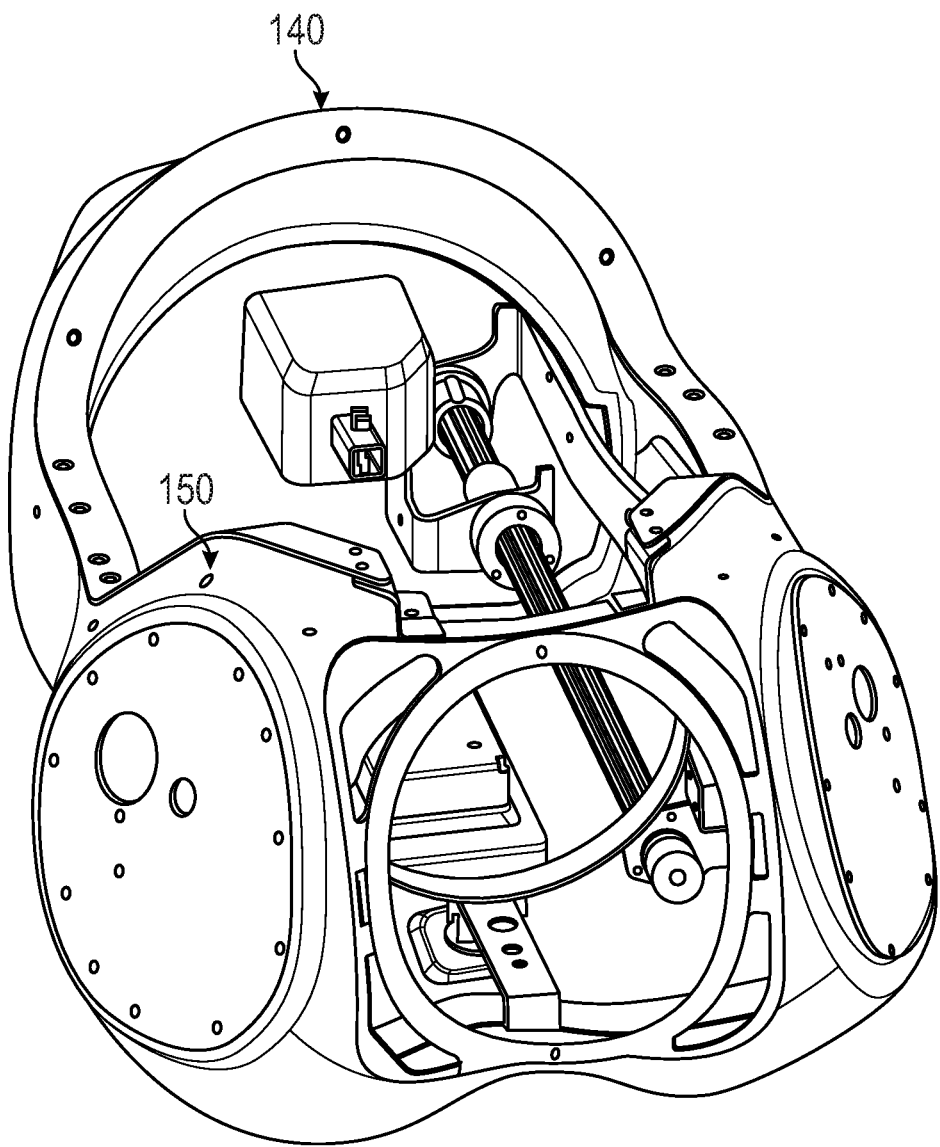
Figure 21:
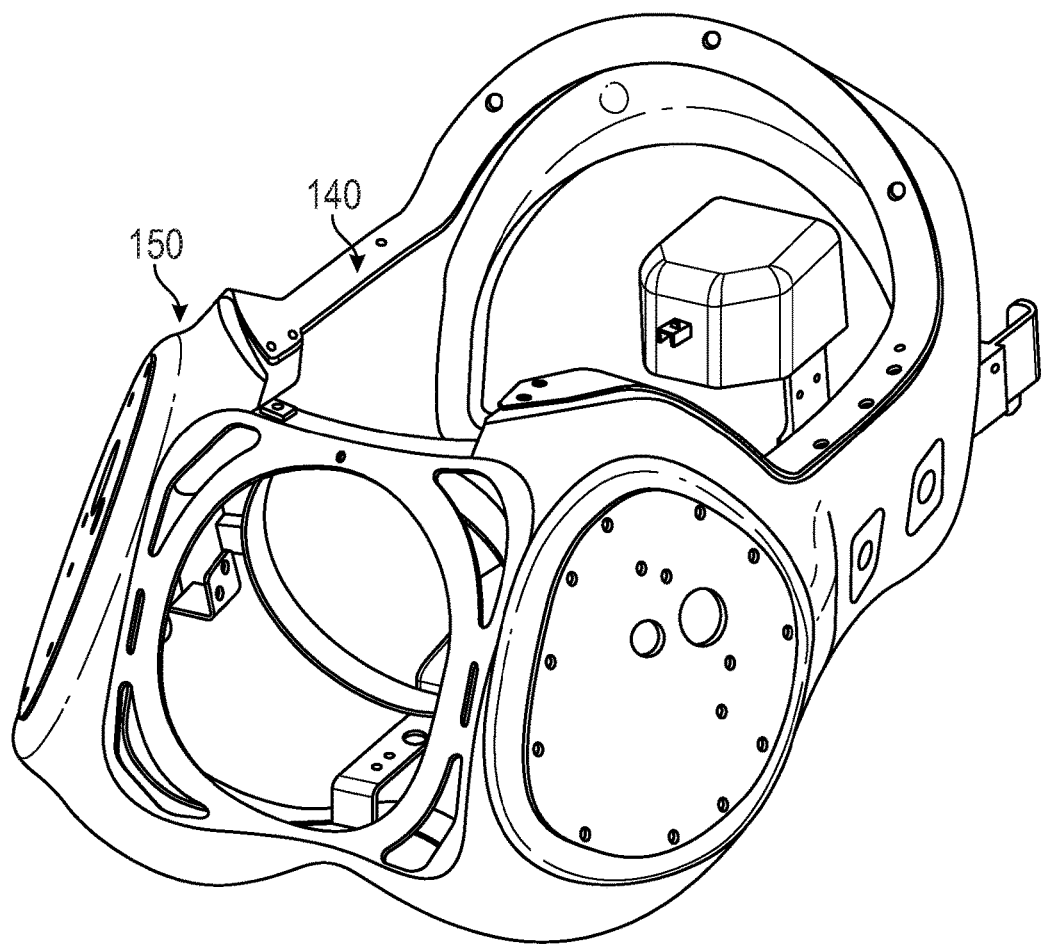

FIGS. 1 and 12 are perspective views of a patient simulator system 100 according to one embodiment of the present disclosure. The patient simulator system 100 includes a maternal patient simulator 110. The maternal patient simulator 110 includes or is configured to interface with a fetal patient simulator, as discussed below, to simulate birthing scenarios. In some embodiments, the patient simulator 110 is tetherless. That is, the patient simulator 110 is functional without wired or tubular connection to other devices outside of the body and, therefore, does not require wires, tubes, or other lines extending from the patient simulator 110 in order to be fully functional. Rather, the patient simulator 110 is self-contained. Thus, the patient simulator 110 can include an internal power supply, such as a rechargeable power cell, and all pneumatic and fluid connections are made to the corresponding compressors or other devices within the patient simulator 110. As the patient simulator 110 is self-contained, it is not only portable, but can be in use while being transported between different locations. Further, in such embodiments, the patient simulator 110 may communicate with other devices, such as a control interface, through wireless communication. Thus, the entire simulator system can be functional up to the limits of the wireless communication. Further, in some embodiments the patient simulator 110 connects wirelessly to a processing system, which in some instances includes a computer or network system, which then connects to other remote devices via a wired or wireless network, making the functional distance of the patient simulator system 100, and in particular the patient simulator 110, virtually limitless. In alternative embodiments, the patient simulator 110 is operable in tethered and tetherless configurations.

As shown in FIGS. 1-3, 12, and 13, the maternal patient simulator 110 comprises a female patient simulator. It is understood that the illustrated embodiment of the maternal patient simulator 110 is sized and shaped to represent a pregnant female carrying a fetus with a gestational age between about 20 weeks and 42 weeks. In that regard, the patient simulator can take a variety of forms, including a manikin sized and shaped to represent patients of any size, age, nationality, and/or health. Further, the maternal patient simulator 110 may include only a portion of the simulated patient (e.g., specific body parts or combinations of body parts). For example, in some implementations, the maternal patient simulator includes a torso without a head, arms, and/or legs. Generally, the combination of anatomical parts may be selected based on the particular type(s) of training that the patient simulator is intended to be used for. In that regard, while it is generally desirable to have a full patient simulator to enhance realism, due to portability, costs, and/or other factors in some implementations task trainers having only the most necessary anatomical parts are utilized.

Further, in some instances, the maternal patient simulator 110 includes a simulated circulatory system, a simulated respiratory system, and/or other simulated aspects. In that regard, the maternal patient simulator 110 is in communication with a control system configured to control the circulatory system, respiratory system, and/or other aspects of the patient simulator. For example, in some instances, the control system is configured to adjust parameters associated with the circulatory system, respiratory system, and/or other aspects of the maternal patient simulator 110 in accordance with a simulation scenario and/or a user's application of treatment to the maternal patient simulator 110 based on the simulation scenario. Further, in some instances the circulatory system, respiratory system, and/or other aspects of the maternal patient simulator are affected by the circulatory system, respiratory system, and/or other aspects of the fetal patient simulator.

To that end, in some embodiments the processing system provides physiological algorithms that are modeled on concurrent differential equations to provide autonomous or semi-autonomous control of the maternal and/or fetal patient simulators' vital signs. In that regard, in many instances the physiological modeling is executed without the need for substantial input or direction from the facilitator or user in control of the simulator system 100. Rather, in many instances, the facilitator or user in control of the simulator need only actuate a particular scenario through a user-interface (e.g., clicking on a simulated button for the particular physiological scenario on a display associated with a computing device) and the physiological models will automatically control the vital signs of the simulators based on the selected scenario and/or the user's interaction with the simulators (e.g., treatments applied to the simulator(s)). In this regard, aspects of the present disclosure are configured for use with the simulators and the related features disclosed in U.S. patent application Ser. No. 13/031,087, which is hereby incorporated by reference in its entirety.

In some instances, a computer system provides a scenario-based learning platform on which core surgical competencies can be taught, perfected, and tested. In some instances, the computer system utilizes an interactive software package containing the scenarios. In some instances, the patient simulator system 100 includes a workbook of advanced scenarios that are pre-programmed in the interactive software package, thereby providing a platform on which team-building scenarios can be performed for the development of OB/GYN skills and general patient safety.

Scenarios can be as simple or complex as desired and can cover an entire procedure, starting from patient presentation, to assessment, to delivery, and ending in the recovery room. Scenarios may be either pre-programmed or self-constructed (i.e., self-designed). Through the use of either pre-programmed or self-constructed scenarios, the patient simulator system (including the maternal patient simulator and/or fetal patient simulator) responds appropriately to interventions and procedures. In some instances, the scenario can cover an entire procedure. In other instances, the scenarios can cover a portion of a single procedure or multiple portions of various procedures. In other instances, the scenarios can cover a series of complete procedures.

To that end, the patient simulator systems of the present disclosure may include hardware, software, and/or communication features similar to those described in one or more of U.S. Provisional Patent Application No. 61/757,143, U.S. patent application Ser. No. 13/752,242, U.S. patent application Ser. No. 13/223,020, U.S. patent application Ser. No. 13/031,116, U.S. patent application Ser. No. 13/031,087, U.S. patent application Ser. No. 13/031,102, U.S. patent application Ser. No. 12/856,903, U.S. patent application Ser. No. 12/708,682, U.S. patent application Ser. No. 12/708,659, U.S. patent application Ser. No. 11/952,606, U.S. patent application Ser. No. 11/952,669, U.S. Pat. No. 8,016,598, U.S. Pat. No. 7,976,313, U.S. Pat. No. 7,976,312, U.S. Pat. No. 7,866,983, U.S. Pat. No. 7,114,954, U.S. Pat. No. 7,192,284, U.S. Pat. No. 7,811,090, U.S. Pat. No. 6,758,676, U.S. Pat. No. 6,503,087, U.S. Pat. No. 6,527,558, U.S. Pat. No. 6,443,735, U.S. Pat. No. 6,193,519, and U.S. Pat. No. 5,853,292, and U.S. Pat. No. 5,472,345, each herein incorporated by reference in its entirety.

Further, in some instances, the patient simulator system 100 includes one or more features as provided in medical simulators and associated systems provided by Gaumard Scientific Company, Inc. based out of Miami, Fla., including but not limited to the following models: S1000 Hal®, S1020 Hal®, S1030 Hal®, S3000 Hal®, S2000 Susie®, S221 Clinical Chloe, S222 Clinical Chloe, S222.100 Super Chloe, S303 Code Blue®, S304 Code Blue®, S100 Susie®, S100 Simon®, S200 Susie®, S200 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle, and/or other patient simulators.

Figure 4:
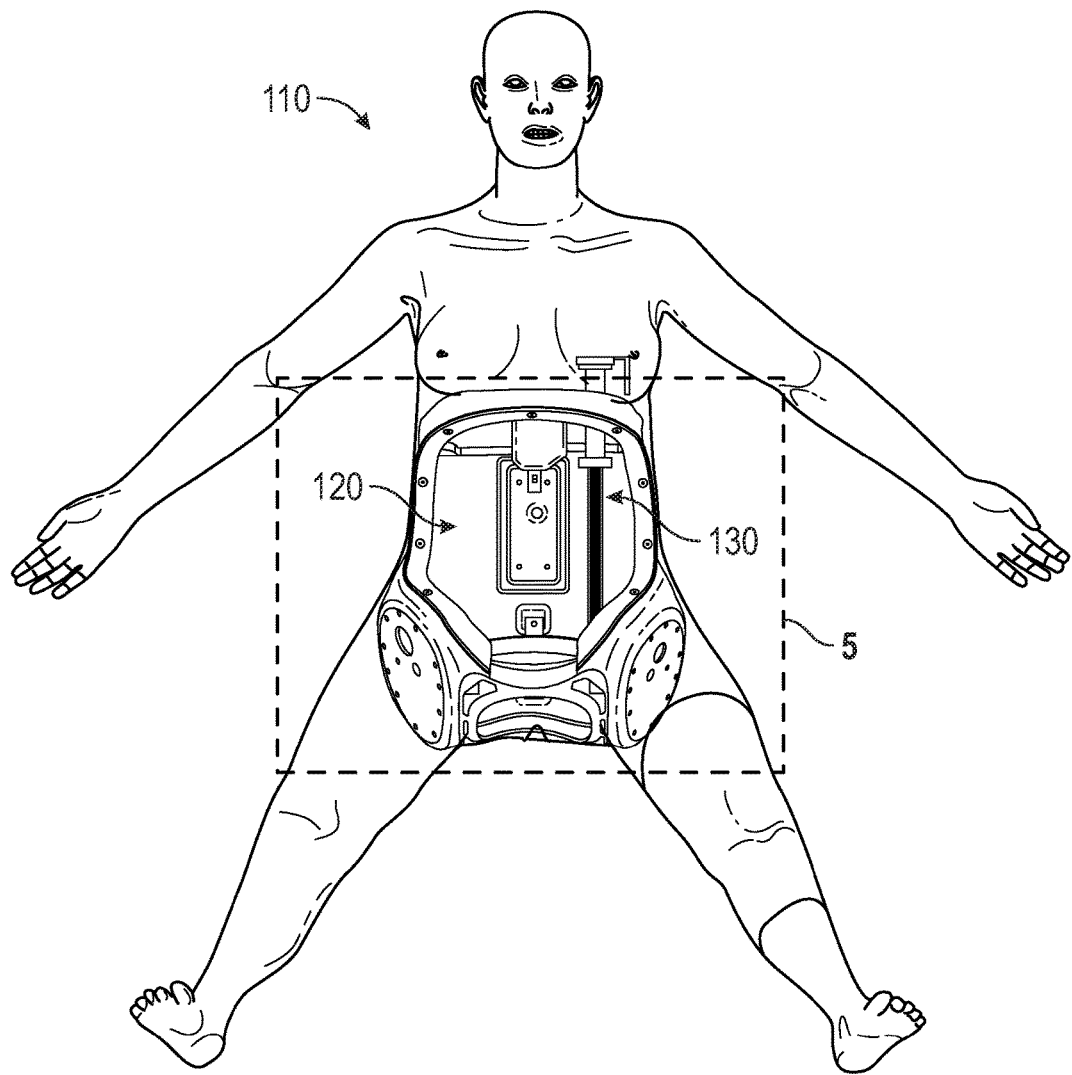
FIG. 4 is a front view of the maternal patient simulator of FIGS. 1-3, but with an outer section of simulator removed to reveal an internal chamber.
Figure 5:
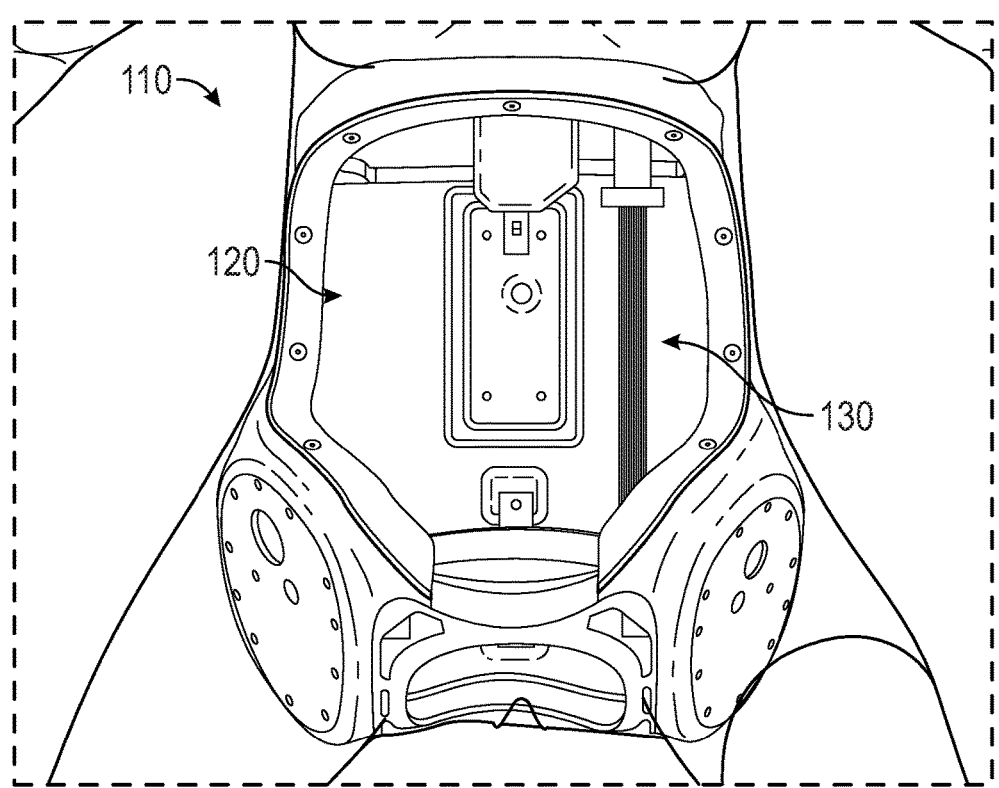
FIG. 5 is a close up front view of the maternal patient simulator of FIGS. 1-4 with the outer section of simulator removed to reveal the internal chamber.
Figure 6:
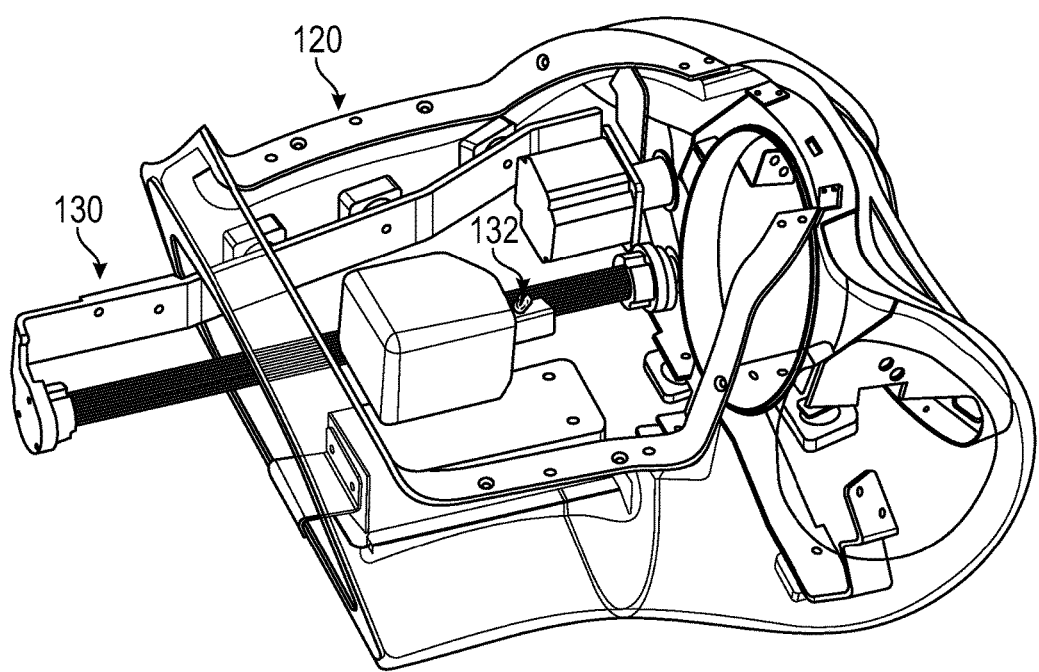
FIG. 6 is a perspective, partially transparent view of a portion of the maternal patient simulator of FIGS. 1-5 showing aspects of a birthing mechanism disposed within the internal chamber of the maternal patient simulator according to an embodiment of the present disclosure.

FIGS. 4 and 5 provide front views of the maternal patient simulator 110 with an outer section, such as a tummy cover, removed to reveal an internal chamber 120. The internal chamber 120 is sized and shaped to receive a fetal patient simulator. In that regard, as shown in FIGS. 4-6, the internal chamber 120 also includes a birthing mechanism 130 configured to interface with the fetal patient simulator. In that regard, the birthing mechanism 130 is configured to impart translational and rotational movement to the fetal patient simulator in order to simulate a birthing sequence. As best seen in FIG. 6, components of the birthing mechanism 130 are mounted to a sidewall of the torso of the maternal patient simulator 110. In some instances, such as the illustrated embodiment, the components of the birthing mechanism 130 are mounted in this fashion to allow room for an epidural insert chamber to be defined in the central portion of the internal chamber 120 adjacent to the back of the maternal patient simulator 110.

Figure 7:
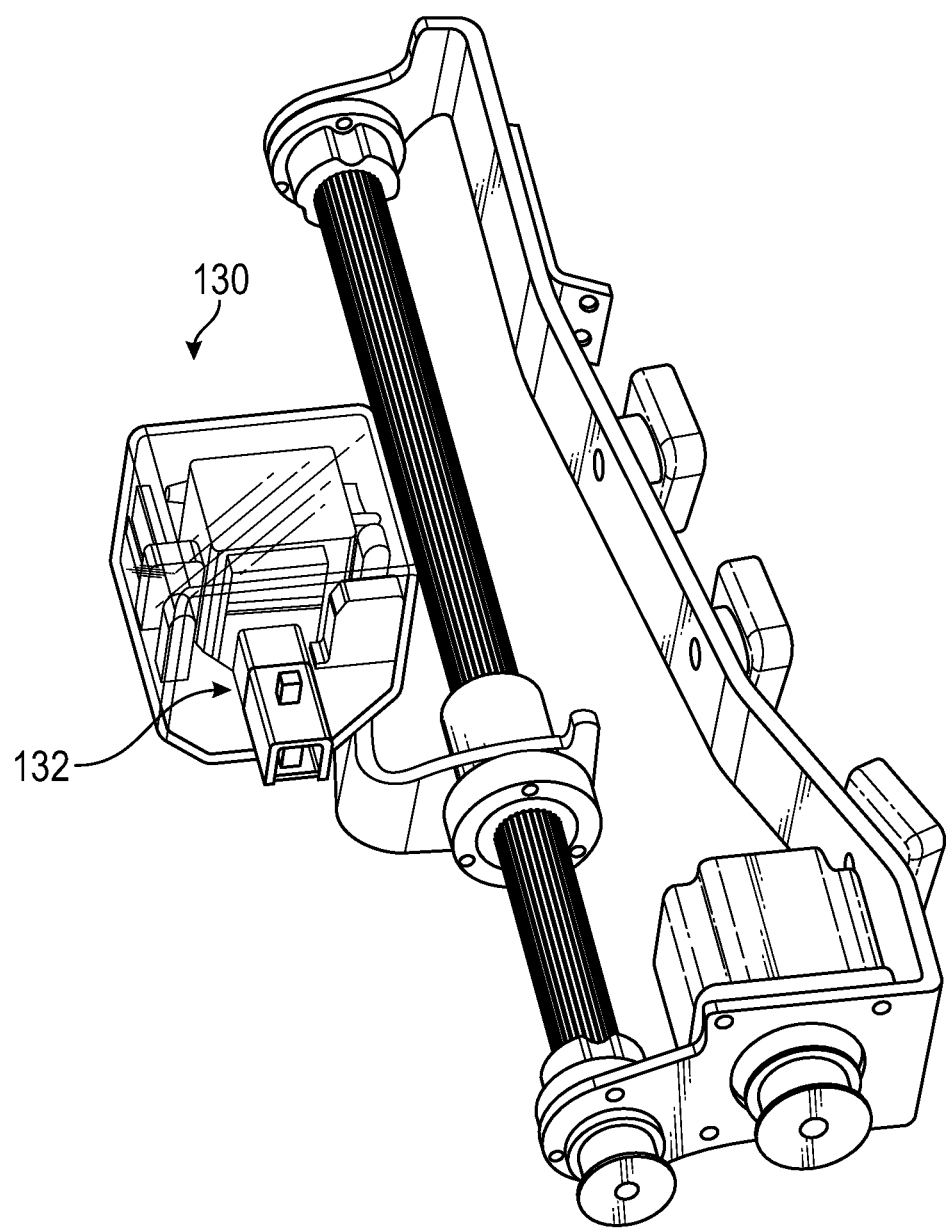
FIG. 7 is a perspective view of the birthing mechanism of FIG. 6.
Figure 8:
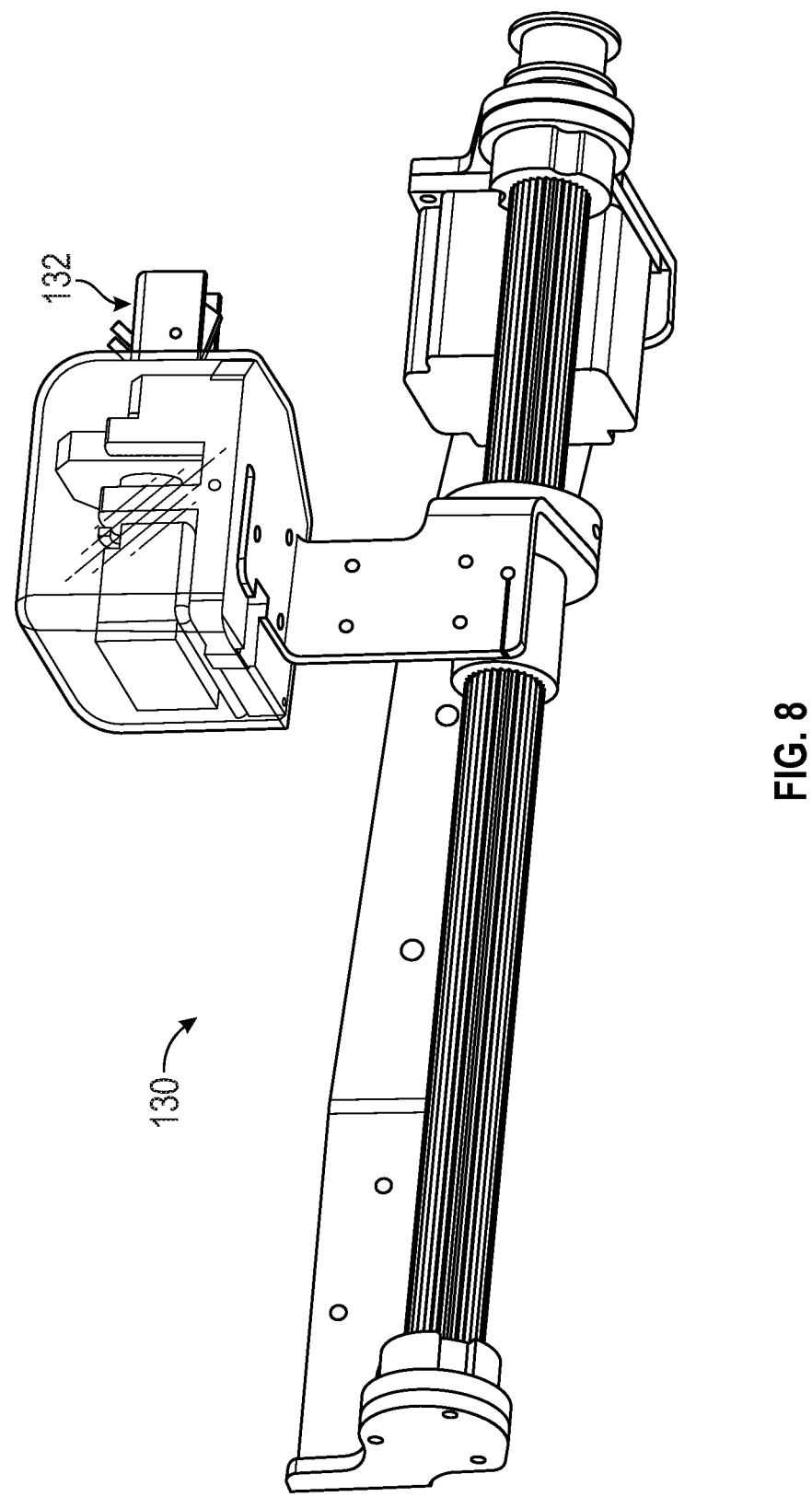
FIG. 8 is another perspective view of the birthing mechanism of FIGS. 6 and 7.
Figure 9:
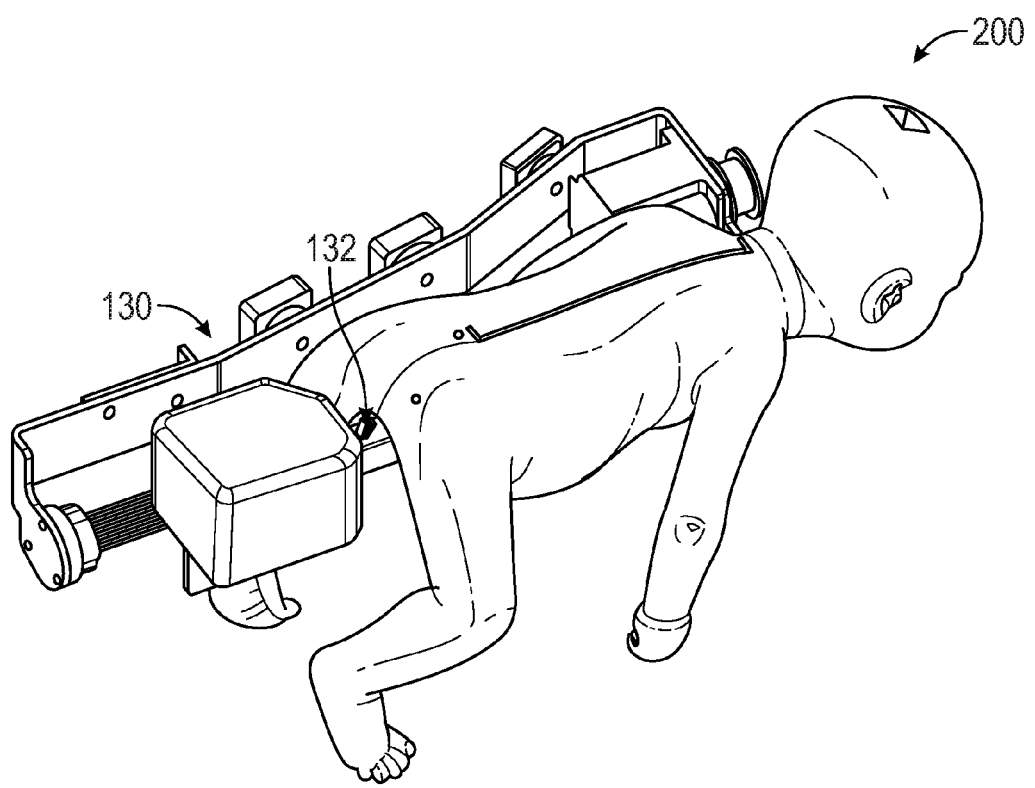
FIG. 9 is a perspective view of a fetal patient simulator engaged with the birthing mechanism of FIGS. 6-8 according to an embodiment of the present disclosure.
Figure 10:
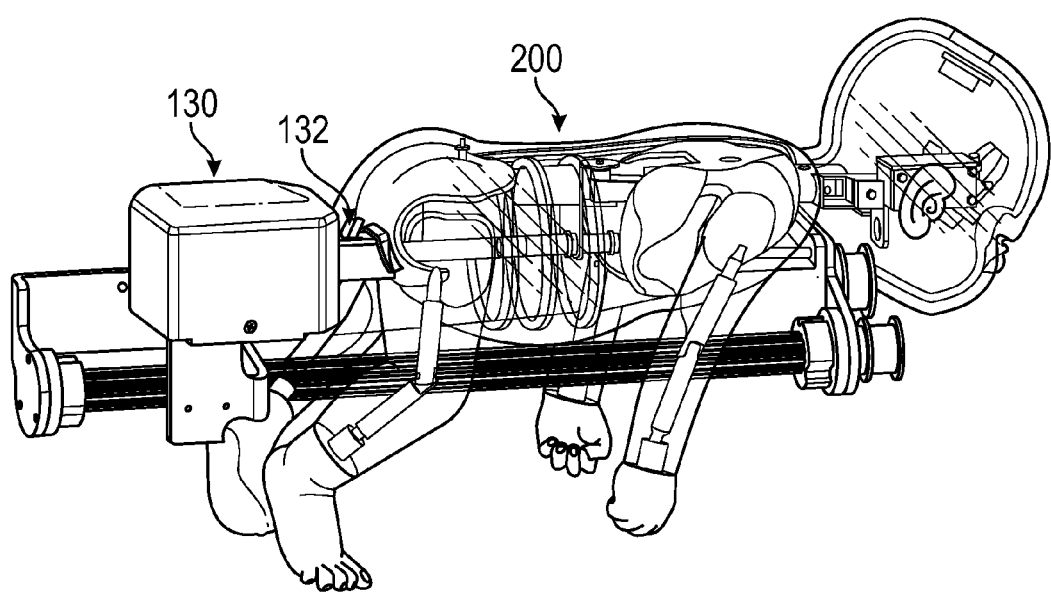
FIG. 10 is a perspective, partially transparent view of the fetal patient simulator of FIG. 9 engaged with the birthing mechanism of FIGS. 6-9.
Figure 11:
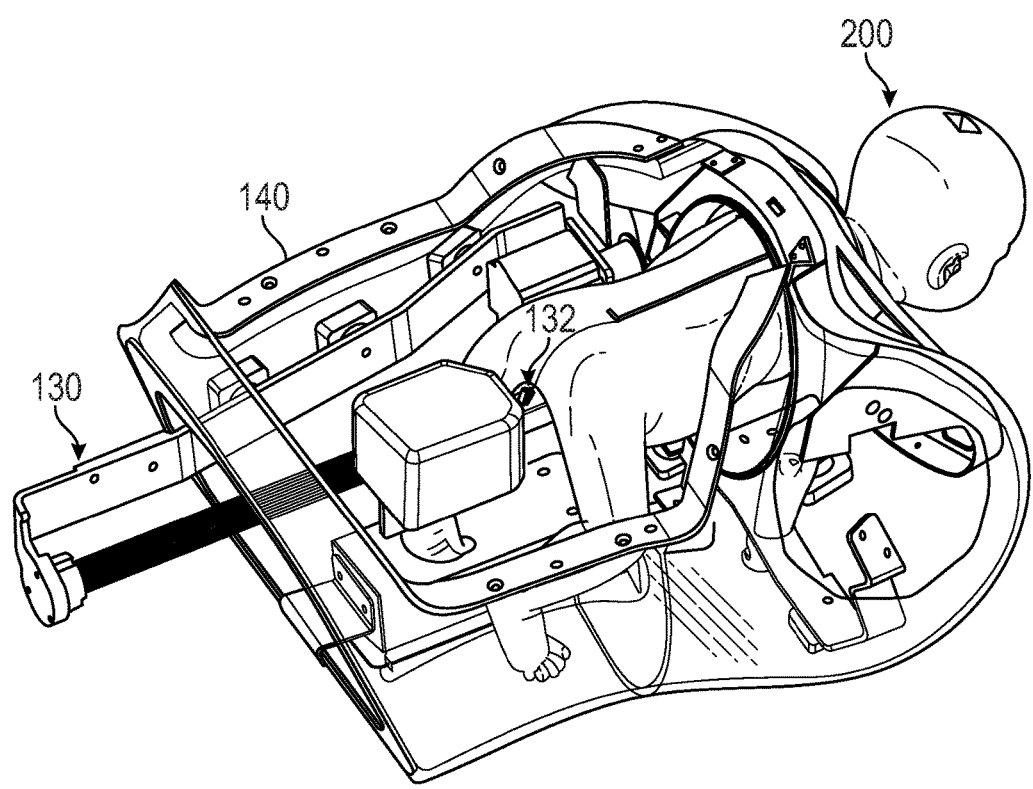
FIG. 11 is a perspective view of the fetal patient simulator engaged with the birthing mechanism and disposed within the internal chamber of the maternal patient simulator according to an embodiment of the present disclosure.

FIGS. 7 and 8 show additional features of the birthing mechanism 130. As shown, the birthing mechanism 130 is an electro-mechanical system configured to impart rotation and translational movement. Further, as shown in FIGS. 9-11, the birthing mechanism is configured to engage with a fetal patient simulator 200. More specifically, in the illustrated embodiments the birthing mechanism 130 includes a locking feature 132 that is configured to fixedly engage a stiffening rod. As will be discussed in greater detail below, the stiffening rod is configured to impart a rigidity to the spinal structure of the fetal patient simulator 200 to allow it to be translated and rotated by the birthing mechanism. In that regard, some of the fetal patient simulators of the present disclosure present highly flexible body structure, simulating a natural newborn, that the stiffening rod is necessary to facilitate a realistic birthing simulation because without the stiffening rod the conformal nature of the fetal patient simulator can result in damage to the fetal patient simulator and/or an unrealistic birthing presentation/sequence.

In some instances, the locking mechanism 132 is a spring-loaded lever that engages a recess or detent of the stiffening rod to provide a mechanical, locking engagement. To that end, in some implementations the stiffening rod is inserted into and engaged with a locking mechanism of the fetal patient simulator 200, as described in greater detail below, then the fetal patient simulator 200 and the stiffening rod are inserted into the internal chamber 120 and a portion of the stiffening rod extending from the fetal patient simulator 200 is engaged with the locking mechanism 132. With the fetal patient simulator 200 engaged with the locking mechanism 132 in this manner, a birthing simulation can begin and the birthing mechanism can impart translational and rotational motion to the fetal patient simulator to simulate a natural birth scenario. In that regard, the actual parameters of the birthing scenario are defined by the control system in some instances.

Referring now to FIGS. 14-17, shown therein is a structural framework 140 of the maternal patient simulator 110 according to an embodiment of the present disclosure. In that regard, as some embodiments of the maternal patient simulator 110 utilize soft silicon outer layers to define a realistic skin layer (e.g., using materials from one or more of the patents and patent applications incorporated by reference above), the maternal patient simulator 110 has a high degree of flexibility and give, simulating a natural human body. However, in order to provide a repeatable and reliable birthing simulation, the maternal patient simulator 110 also includes structural framework 140 formed of a rigid material (e.g., metal (aluminum, stainless steel, sheet metal, etc.) or rigid plastic). In that regard, the structural framework 140 provides a rigid structure to which the other components of the maternal patient simulator 110 can be attached to and/or aligned with. In particular, in some implementations the structural framework 140 is utilized to align the birthing mechanism 130 with the birth canal of the maternal patient simulator 110. Having the birthing mechanism 130 properly aligned prevents unwanted wear and/or stress on the birthing mechanism 130 and/or the fetal patient simulator 200 that results from the increased friction, stress, and/or bending associated with misalignment.

Referring now to FIGS. 18-21, shown therein is the structural framework 140 with another sub-layer 150 of the maternal patient simulator 110 engaged therewith. In the illustrated embodiment, the sub-layer 150 is formed vinyl and provides a structural support and/or alignment features for the soft silicon skin layers and/or other components of the maternal patient simulator 110. For example, in some instances the sub-layer 150 includes openings, recesses, projections, and/or other structural features to facilitate the alignment and assembly of various components of the maternal patient simulator. Further, in some instances the sub-layer 150 is formed of a material that is softer than that of the structural framework 140 and that provides a more realistic feel to internal structures of a natural human body than that of the structural framework 140.

Referring now to FIGS. 22-25, shown therein are aspects of a hip joint of the maternal patient simulator 110 according to an embodiment of the present disclosure. As shown, the hip joint of the maternal patient simulator 110 includes a plate 160 that is secured to the torso of the maternal patient simulator 110 and, in particular, the structural framework 140 and/or the sub-layer 150 in some instances. To provide a realistic hip motion, a flexible tubular member 162 connects the plate 160 attached to the torso of the maternal patient simulator 110 to a component attached to a leg of the maternal patient simulator 110. In that regard, the flexible tubular member 162 is hydraulic tubing in some instances. For example, in some instances the flexible tubular member is rubber tubing with metal reinforcing mesh to provide sufficient structural rigidity along the axial length of the tubing to prevent collapsing, but sufficient flexibility to simulate the ball-and-socket motion of a natural hip joint. In the illustrated embodiment, each end of the flexible tubular member 162 is engaged with a barb 164. In particular, the barb 164 is positioned within the inner lumen of the tubular member 162. In some instances, a clamp is positioned around the flexible tubular member 162 and the barb 164 to further secure the flexible tubular member 162 to the barb 164. In order to limit the range of motion of the hip joint to a more natural range of motion than the flexible tubular member 162 alone would provide, the hip joint includes one or more tethered connections between the plate 160 and a portion of the leg. For example, as shown in FIGS. 24 and 25 four cables 166 are connected between the plate 160 and the leg of the patient simulator. The lengths of the cables 166 are selected to provide a realistic range of motion to the hip joint in the various directions. A similar approach can be utilized to form the shoulder joints of the maternal patient simulator 110.

In some implementations, the maternal patient simulator includes a distensible cervix that can be controlled independently of the position of the fetal simulator. In that regard, previous birthing simulators have relied upon the descent of the fetal simulator to cause the cervix to dilate. However, to more realistically simulate various birthing scenarios, the maternal patient simulator 110 includes a cervix where dilation can be controlled separately from the position of the fetal simulator. For example, in some implementations the cervix is defined by a flexible material (e.g., silicon) that includes an opening. In that regard, the size of the opening defines the amount of dilation of the cervix. Accordingly, by selectively increasing (or decreasing) the size of the opening the simulated dilation of the cervix is changed. To that end, in some instances a cord is disposed within the material surrounding the opening such that tensioning the cord can be utilized to selectively expand or contract the opening defined by the material. For example, in some instances at least one end of the cord is coupled to a motor such that when the motor is actuated in a first direction the cord is tensioned, retracted, and wrapped around a pulley or other member to increase/decrease the size of the opening. When the motor is actuated in a second direction (opposite of the first direction) and/or the cord is otherwise released from the tensioned, retracted, or wrapped position, the size of the opening decreases/increases accordingly. By selectively controlling actuation of the motor (or other control mechanism) dilation of the cervix can be controlled. Accordingly, in some instances the control system defines the amount of dilation of the cervix for a particular scenario independent of the descent of the fetal simulator along the birth canal.

Referring now to FIGS. 26-53, aspects of the fetal patient simulator 200 according to embodiments of the present disclosure will be described. In that regard, in addition to the features specifically described below, it is understood that the fetal patient simulator 200 may include features similar to those described with respect to the fetal and/or newborn patient simulators in the patents and patent applications incorporated by reference above, especially the respiratory and/or circulatory features. However, for sake of brevity these various features will not be described in detail below.

FIG. 26 provides a front view of the fetal patient simulator 200, while FIG. 27 provides a perspective view of the fetal patient simulator of FIG. 26. As shown, the fetal simulator 200 includes a continuous, flexible outer skin layer that covers the internal components of the fetal simulator. More specifically, in some instances the entire outer skin layer other than that associated with the hands and feet of the fetal patient simulator are formed of a single, continuous piece of silicon. In some instances, an opening in the single, continuous piece of silicon that is utilized to insert the internal components of the fetal patient simulator is bonded, glued, and/or otherwise secured together along the back or spine of the patient such that the outer skin layer provides a realistic, continuous skin layer over all but the hands and feet of the patient simulator. To that end, the hands and feet of the patient simulator are formed of the same or similar material as the majority of the outer skin layer in some instances. In some instances, the hands and/or feet are formed of a slightly harder material than the majority of the outer skin layer to increase the durability of those portions of the fetal patient simulator.

Referring now to FIG. 28-31, shown therein are aspects of the internal components of the fetal patient simulator. More specifically, as shown the fetal patient simulator 200 includes an internal structure that includes an articulating spine formed or a plurality of pivoting joints, articulating arms and legs, and a moveable head assembly. For example, FIGS. 31-35 illustrate aspects of the spine assembly. In that regard, FIG. 31 provides a cross-sectional side view of the inner components of the fetal patient simulator, including the spine assembly; FIG. 32 is a perspective view of the spine assembly; FIG. 33 is a side view of the spine assembly; FIG. 34 is a front view of a joint of the spine assembly that includes an encoder; and FIG. 35 is a front view of a joint of the spinal assembly that does not include an encoder. As shown, the spine assembly includes a plurality of pivoting joints connected together to define ranges of motion that mimic that of an infant spine, which is highly flexible and/or floppy in some instances. In order to monitor the relative position(s) of the joints some of the joints include an angle or position encoder, as shown in FIG. 34. Further, in some instances one or more of the joints includes force or pressure sensor(s) to monitor the forces being applied to the joints of the fetal patient simulator. The information from the angle/position encoder(s) and/or the force/pressure sensor(s) can be supplied to the control system and utilized in evaluation of the treatment being applied by the user. For example, if the user is putting too much force on the fetal simulator's neck or spine as a resulting trying to pull the fetal simulator out prematurely and/or improperly attempting to rotate the fetal simulator, then the readings from these sensors will reflect that. Further, the angle/position sensors can be utilized to depict a 3-D representation of the fetal simulator on a display of the control system for current and/or later evaluation by a teacher and/or the user.

FIGS. 36 and 37 provide perspective views of a partially assembled fetal patient simulator 200 according to an embodiment of the present disclosure. As best seen in FIG. 36, the spine assembly includes a plurality of openings extending along the length of the spine that are sized and shaped to receive a stiffening rod. In that regard, because of the highly flexible nature of the spine assembly of the fetal patient simulator 200, a stiffening rod is inserted through the openings in the spine assembly to provide rigidity and alignment to the spine assembly during a birthing simulation. In that regard, the stiffening rod provides sufficient structural rigidity to the fetal simulator 200 to allow the birthing mechanism 130 of the maternal simulator 110 to birth the fetal simulator 200 through the birth canal of the maternal simulator 110. To that end, the openings in the spine assembly of the fetal patient simulator 200 are aligned (or alignable) with an opening in the bottom of the fetal patient simulator 200 that is configured to receive the stiffening rod. To that end, FIG. 31 shows the stiffening rod received within the patient simulator 200, while FIGS. 38-40 show aspects of a locking mechanism of the fetal patient simulator 200 that is configured to selectively engage the stiffening rod. More specifically, as shown in FIGS. 38-40, the locking mechanism includes a spring-biased lever with a projection sized and shaped to engage a recess or detent formed in the outer profile of the stiffening rod such that when the projection is engaged with the recess or detent (FIG. 39 shows this best) the locking mechanism and, thereby, the fetal simulator is fixedly engaged with the stiffening rod. In some instances, a portion of the stiffening rod will extend outside of the fetal simulator 200 for engagement with the locking mechanism 130 of the maternal simulator 110 (as described above).

The locking mechanism of the fetal patient simulator 200 is electronically controlled to selectively release the fetal patient simulator 200 from engagement with the stiffening rod. In that regard, by maintaining engagement of the fetal patient simulator 200 with the stiffening rod a user is prevented from prematurely pulling the fetal patient simulator 200 from the birth canal during a birthing simulation. Instead, any excess force applied by the user in attempts to prematurely remove the fetal simulator will be registered by the force/pressure sensor(s) and/or position/angle encoder(s) of the fetal simulator. Further, once the birthing sequence has progressed to a point where the fetal patient simulator 200 can be removed from the maternal simulator 110, then the lever of the locking mechanism of the patient simulator 200 is removed from engagement with the recess or detent of the stiffening rod. With the locking mechanism of the fetal patient simulator 200 disengaged from the stiffening rod (and the locking mechanism of the maternal simulator 110 still engaged with the stiffening rod), the fetal patient simulator 200 can be removed from the maternal simulator 110 at which point the stiffening rod will have passed through the openings in the spine assembly and out the bottom of the fetal simulator 200, such that the spine assembly of the fetal simulator 200 is no longer held in the rigid, aligned position defined by the stiffening rod. As a result, the fetal simulator 200 exhibits the highly flexible spinal structure of a typical newborn upon birth. In this manner, the system provides sufficient structural definition to facilitate birthing of the fetal simulator without compromising the realistic, highly flexible nature of the fetal simulator upon birth. In some instances, the stiffening rod is manually detached from the locking mechanism 132 of the maternal simulator 110 and reinserted into the fetal simulator 200 prior to the next birthing simulation.

Referring now to FIGS. 41-44, shown therein are aspects of the arms and legs of the fetal patient simulator 200, including the shoulder, elbow, hip, and knee joints. In that regard, in some instances the shoulder and/or hip joints of the fetal patient simulator 200 are defined by at least in part by a flexible tubular member, similar to the hip joint of maternal simulator 110 described above. However, due to the highly flexible nature of fetal joints and the smaller mass associated with the components of the arm and leg components of the fetal simulator 200, in some instances the hip and/or shoulder joints are solely defined by the flexible tubing, without the need for tethers to limit the range of motion. However, in other instances tethers are utilized in a similar manner to that described above for the maternal simulator. As shown in FIGS. 43 and 44, the elbow and knee joints of the fetal patient simulator are configured to provide a realistic range of motion. FIGS. 41 and 42 also illustrate that, also similar to maternal simulator 110, the internal support structure of the fetal patient simulator 200 includes a sub-layer (similar to sub-layer 150) that is secured to metallic or other rigid structural components of the fetal patient simulator 200. In some instances the sub-layer is formed vinyl and provides a structural support and/or alignment features for the soft silicon skin layer and/or other components of the fetal patient simulator 200. For example, in some instances the components of the sub-layer include openings, recesses, projections, and/or other structural features to facilitate the alignment and assembly of various components of the fetal patient simulator and/or provide realistic anatomical landmarks that can be felt through the outer silicon skin layer(s). In that regard, in some instances the sub-layer is formed of a material that is softer than that of the spine assembly and that provides a more realistic feel to internal structures of a natural newborn or fetus.

Referring now to FIGS. 45 and 46, shown therein are side, cross-sectional views of a head of the fetal patient simulator 200. In that regard, the fetal patient simulator 200 includes an actuator disposed within the head to facilitate movement of the head. In particular, the actuator is configured to selectively raise or lift the head of the fetal patient simulator 200. To that end, FIG. 45 shows the head in a neutral position. As shown, a cord or line extends from the actuator across the space within the head and is secured to a structure inside the head adjacent to the forehead. As shown in FIG. 46, the head has been moved to raised or lifted position by the actuator. In that regard, the length of the cord or line extending between the actuator and the structure inside the head adjacent to the forehead has been shortened causing the head to tilt up or back. In some instances, the actuator is a motor and/or pulley system that is configured to selectively retract or wrap the cord/line to cause the head to tilt. By either releasing the cord/line or reversing operation of the actuator, the head will return to the neutral position of FIG. 45.

In some instances, the tilting functionality of the head described above is utilized to simulate the rise of the fetus's head during a natural birth. In that regard, the birthing scenario implemented by the control system can cause the actuator to selectively tilt the head and/or return to the neutral position at the appropriate times during the birthing sequence to more realistically simulate the natural birthing sequence. In this manner, the natural rise of the fetal simulator can be simulated without needing to account for complicated three-dimensional position control with the birthing mechanism 130. In other instances, an inflatable bag or other member positioned outside of the fetal simulator within the chamber 120 of the maternal simulator 110 can be selectively inflated or actuated to impart a tilt or rise of the head of the fetal simulator 200 during the birthing sequence.

Referring now to FIGS. 47 and 48, shown therein are aspects of an attachable umbilical cord for use with the fetal patient simulator 200. In that regard, in some implementations the umbilical cord is similar one or more of the umbilical cords described in the patents and patent applications incorporated by reference above, including various lumen structures and associated realistic materials. In the illustrated embodiment, the belly button of the fetal patient simulator 200 includes a magnet therein and an end of the umbilical cord configured to be attached to the belly button includes a magnetically attractive material, such as suitable metal, such that the umbilical cord can be magnetically attached to and detached from the belly button of the fetal simulator. FIG. 48 shows the umbilical cord magnetically attached to the belly button of the fetal simulator 200.

Referring now to FIGS. 49-53, shown therein are aspects of a foot of the fetal patient simulator 200 according to an embodiment of the present disclosure. In particular, FIGS. 49-53 show aspects of a foot that includes a communication and/or power port disposed therein for use in communicating with, programming, updating, and/or charging the internal components of the fetal patient simulator. In that regard, FIGS. 49 and 52 show the foot in a fully assembled state with a plug cover in place. As shown, the plug cover provides a relative smooth and continuous bottom surface to the foot. However, the plug cover is removable (as shown in FIGS. 50 and 53 to provide access to the communication and/or power port disposed within the foot (as shown in FIG. 51). To that end, the communication and/or power port is stand protocol port (e.g., USB) in some implementations. In other implementations, the communication and/or power port is a custom connector. Further, in some instances, the communication and/or power port includes a plurality of ports, which may be standard, custom, and/or combinations thereof. The communications and/or power port is utilized to charge a battery or other power source of the fetal patient simulator in some instances. In some instances, the communications and/or power port is utilized to reprogram and/or update aspects of the software or firmware executing inside of the fetal patient simulator. In other instances, wireless communication is utilized to facilitate communicating with, programming, updating, and/or charging the internal components of the fetal patient simulator.

Persons of ordinary skill in the art will appreciate that the embodiments encompassed by the present disclosure are not limited to the particular exemplary embodiments described above. In that regard, although illustrative embodiments have been shown and described, a wide range of modification, change, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A method, comprising:
   providing a fetal patient simulator that includes:
      an internal support structure comprising spinal components, left arm components, right arm components, left leg components, and right leg components; and
      a skin layer covering the internal support structure;
   introducing a stiffening rod through a plurality of openings in the spinal components of the internal support structure of the fetal patient simulator to provide rigidity and alignment to the spinal components of the fetal patient simulator; and
   removing the stiffening rod from the plurality of openings in the spinal components of the internal support structure of the fetal patient simulator to provide a flexible body structure simulating a natural newborn.

2. The method of claim 1, further comprising monitoring a relative position of a spinal joint of the spinal components of the internal support structure.

3. The method of claim 2, wherein the monitoring the relative position of the spinal joint includes tracking movement of the spinal joint with a motion encoder.

4. The method of claim 2, further comprising displaying on a display a visual representation of a position of the fetal patient simulator based on the monitoring.

5. The method of claim 1, further comprising monitoring a force applied to the fetal patient simulator.

6. The method of claim 5, wherein the monitoring the force applied to the fetal patient simulator includes detecting the force with a force sensor or a pressure sensor coupled to a spinal joint of the spinal components of the internal support structure.

7. The method of claim 1, further comprising positioning the fetal patient simulator within an internal chamber of a maternal patient simulator.

8. The method of claim 7, wherein the stiffening rod is removed from the plurality of openings in the spinal components of the internal support structure of the fetal patient simulator when the fetal patient simulator is removed from the maternal patient simulator.

9. The method of claim 7, further comprising engaging the fetal patient simulator with a birthing mechanism disposed within the internal chamber.

10. The method of claim 9, wherein the engaging the fetal patient simulator with the birthing mechanism includes engaging a portion of the stiffening rod with the birthing mechanism.

11. The method of claim 10, further comprising activating the birthing mechanism to translate and rotate the fetal patient simulator with respect to the maternal patient simulator to simulate a birth.

12. The method of claim 11, wherein the stiffening rod is removed from the plurality of openings in the spinal components of the internal support structure of the fetal patient simulator when the fetal patient simulator is removed from the maternal patient simulator following the translation and rotation of the fetal patient simulator with respect to the maternal patient simulator.

* * * * *